(12) United States Patent
Yoon et al.

(10) Patent No.: US 11,733,952 B2
(45) Date of Patent: Aug. 22, 2023

(54) WEARABLE ELECTRONIC DEVICE INCLUDING DISPLAY, METHOD FOR CONTROLLING DISPLAY, AND SYSTEM INCLUDING WEARABLE ELECTRONIC DEVICE AND CASE

(71) Applicant: Samsung Electronics Co., Ltd., Suwon-si (KR)

(72) Inventors: Jongmin Yoon, Suwon-si (KR); Seungnyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 17/434,933

(22) PCT Filed: Aug. 26, 2021

(86) PCT No.: PCT/KR2021/011467
§ 371 (c)(1),
(2) Date: Aug. 30, 2021

(87) PCT Pub. No.: WO2022/092517
PCT Pub. Date: May 5, 2022

(65) Prior Publication Data
US 2022/0350559 A1 Nov. 3, 2022

(30) Foreign Application Priority Data
Oct. 30, 2020 (KR) .................. 10-2020-0143693

(51) Int. Cl.
*G06F 3/14* (2006.01)
*G02B 27/00* (2006.01)
(Continued)

(52) U.S. Cl.
CPC ....... *G06F 3/1423* (2013.01); *G02B 27/0093* (2013.01); *G02B 27/0172* (2013.01);
(Continued)

(58) Field of Classification Search
CPC ............... A45C 11/04; G02B 27/0093; G02B 27/0172; G02B 27/0176;
(Continued)

(56) References Cited

U.S. PATENT DOCUMENTS 9,250,442 B2  2/2016  Cho et al.
9,958,681 B2  5/2018  Ko et al.
(Continued)

FOREIGN PATENT DOCUMENTS

JP  WO2014/103732 A1  1/2017
KR  10-2011-0044080 A  4/2011
(Continued)

OTHER PUBLICATIONS

International Search Report dated Dec. 22, 2021, issued in International Application No. PCT/KR2021/011467.

*Primary Examiner* — Nelson M Rosario
(74) *Attorney, Agent, or Firm* — Jefferson IP Law, LLP

(57) ABSTRACT

A wearable electronic device is provided. The wearable electronic device includes a housing including a first housing portion, a second housing portion, and a third housing portion, glasses surrounded by the second housing portion, a display for displaying screens in an inner direction and an outer direction on display areas of the glasses, a sensor module including a first sensor for identifying whether a user is wearing the wearable electronic device, a second sensor for determining a direction where the wearable electronic device is placed, and a third sensor for determining whether the first housing portion or the third housing portion is folded, a camera module including first cameras for tracking a hand gesture of the user and recognizing a space, second cameras for tracking pupils of the user, and a (Continued)

third camera for capturing the outside, and a processor connected with the display, the sensor module, and the camera module.

14 Claims, 21 Drawing Sheets

(51) Int. Cl.
 *G02B 27/01* (2006.01)
 *G06F 3/01* (2006.01)
(52) U.S. Cl.
 CPC ........ *G06F 3/017* (2013.01); *G02B 2027/014* (2013.01); *G02B 2027/0118* (2013.01); *G02B 2027/0138* (2013.01); *G02B 2027/0178* (2013.01)
(58) Field of Classification Search
 CPC .... G02B 2027/0118; G02B 2027/0138; G02B 2027/014; G02B 2027/0178; G02B 2027/0187; G06F 1/163; G06F 3/017; G06F 3/1423; G06F 3/14; G09G 5/373; G09G 5/38; G09G 2340/04; G09G 2340/045; G09G 2340/0464; G09G 2340/0492; G09G 2340/12
 See application file for complete search history.

(56) References Cited

U.S. PATENT DOCUMENTS

| | | | |
|---|---|---|---|
| 10,168,772 | B2 | 1/2019 | Kim et al. |
| 11,042,034 | B2 | 6/2021 | Sztuk et al. |
| 2011/0096154 | A1 | 4/2011 | Nam et al. |
| 2015/0015458 | A1 | 1/2015 | Cho et al. |
| 2015/0331486 | A1 | 11/2015 | Okubo et al. |
| 2016/0166146 | A1* | 6/2016 | Sarkar ................. G02B 26/101 351/210 |
| 2016/0252725 | A1 | 9/2016 | Ko et al. |
| 2017/0102767 | A1 | 4/2017 | Kim et al. |
| 2017/0115742 | A1* | 4/2017 | Xing .................... G06F 3/0485 |
| 2020/0088999 | A1 | 3/2020 | Wang |
| 2020/0209628 | A1 | 7/2020 | Sztuk et al. |

FOREIGN PATENT DOCUMENTS

| | | |
|---|---|---|
| KR | 10-2015-0007129 A | 1/2015 |
| KR | 10-2015-0043834 A | 4/2015 |
| KR | 10-2015-0048576 A | 5/2015 |
| KR | 10-2016-0047305 A | 5/2016 |
| KR | 10-2017-0042877 A | 4/2017 |

* cited by examiner

WEARABLE ELECTRONIC DEVICE INCLUDING DISPLAY, METHOD FOR CONTROLLING DISPLAY, AND SYSTEM INCLUDING WEARABLE ELECTRONIC DEVICE AND CASE

CROSS-REFERENCE TO RELATED APPLICATION(S)

This application is a U.S. National Stage application under 35 U.S.C. § 371 of an International application number PCT/KR2021/011467, filed on Aug. 26, 2021, which is based on and claims priority of a Korean patent application number 10-2020-0143693, filed on Oct. 30, 2020, in the Korean Intellectual Property Office, the disclosure of which is incorporated by reference herein in its entirety.

TECHNICAL FIELD

The disclosure relates to a wearable electronic device including a display, a method for controlling the display, and a system including the wearable electronic device and a case.

BACKGROUND ART

An electronic device may include a display. The display may display a screen on a display area. A user may identify the screen displayed on the display area by the display and may identify a state of the electronic device, an event generated in the electronic device, an application run on the electronic device, and/or information received by the electronic device.

Recently, there has been an increase in wearable electronic device worn on the body of the user. A display of the wearable electronic device may display screens considering a state where the user is wearing the wearable electronic device on display areas. For example, when the wearable electronic device is augmented reality (AR) glasses, the display of the wearable electronic device may display screens on display areas of glasses in a state where the wearable electronic device is worn on the face of the user.

The above information is presented as background information only to assist with an understanding of the disclosure. No determination has been made, and no assertion is made, as to whether any of the above might be applicable as prior art with regard to the disclosure.

DISCLOSURE

Technical Problem

A wearable electronic device may display screens in a direction where a user is wearing the wearable electronic device. Although the wearable electronic device is taken off the user, the wearable electronic device may display screens in the direction where the user is wearing the wearable electronic device. The user may identify screens in a direction where the display of the wearable electronic device displays the screens on display areas (e.g., a direction where the user looks at the wearable electronic device when the wearable electronic device is worn). When the user who is not wearing the wearable electronic device is located in a direction opposite to a direction where the user is wearing the wearable electronic device, it may not easy for the user to identify screens displayed on display areas by the display of the wearable electronic device.

Furthermore, the wearable electronic device may be received in a case for charging and maintenance. When the wearable electronic device is received in the case, it may not easy to identify screens displayed on display areas by the display of the wearable electronic device.

Aspects of the disclosure are to address at least the above-mentioned problems and/or disadvantages and to provide at least the advantages described below. Accordingly, an aspect of the disclosure is to provide a method for controlling a display of a wearable electronic device to identify screens displayed on display areas by the display of the wearable electronic device although a user who takes off the wearable electronic device is located in a direction opposite to the direction where the user is wearing the wearable electronic device, a wearable electronic device including the display, and a system for identifying screens displayed on display areas by the display of the wearable electronic device when received in a case.

Technical Solution

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a housing including a first housing portion, a second housing portion, and a third housing portion, glasses surrounded by the second housing portion, a display configured to display screens in an inner direction and an outer direction on display areas of the glasses, a sensor module including a first sensor configured to identify whether a user is wearing the wearable electronic device, a second sensor configured to determine a direction where the wearable electronic device is placed, and a third sensor configured to determine whether the first housing portion and/or the third housing portion are/is folded, a camera module including first cameras configured to track a hand gesture of the user and recognize a space, second cameras configured to track pupils of the user, and a third camera configured to capture the outside, and a processor connected with the display, the sensor module, and the camera module. The processor may be configured to control the screens displayed on the display areas by the display based on whether the wearable electronic device is worn, the direction where the wearable electronic device is placed, whether the first housing portion and/or the third housing portion are/is folded, and a position of the user.

In accordance with another aspect of the disclosure, a method for controlling screens displayed on display areas by a display of a wearable electronic device is provided. The method includes identifying whether a user is wearing the wearable electronic device using a first sensor, determining a direction where the wearable electronic device is placed using a second sensor, when the wearable electronic device is not worn, determining whether a first housing portion and/or a third housing portion of the wearable electronic device are/is folded using a third sensor, determining a position of the user using first cameras and second cameras, and controlling the screens displayed on the display areas by the display based on whether the wearable electronic device is worn, the direction where the wearable electronic device is placed, whether the first housing portion and/or the third housing portion are/is folded, and the position of the user.

In accordance with another aspect of the disclosure, a wearable electronic device of a system including the wearable electronic device and a case is provided. The wearable electronic device includes a housing, glasses including display areas, a display configured to display screens on the display areas, a camera module, a first communication circuitry, and a processor. The case may include a receiving part configured to receive the wearable electronic device, a lens module disposed on at least a partial surface of the case, a second communication circuitry configured to transmit and receive a signal with the first communication circuitry, and a charging circuitry configured to charge the wearable electronic device. The lens module may show the screens, when the wearable electronic device 101 is received in the receiving part.

Advantageous Effects

According to embodiments disclosed in the disclosure, screens displayed on display areas by the display may be controlled based on whether the wearable electronic device is worn, a direction where the wearable electronic device is placed, whether a frame (or a housing) is folded, and/or a position of the user. Thus, when the user is located in a direction opposite to the direction where he or she is wearing the wearable electronic device, he or she may identify screens displayed on display areas by the display of the wearable electronic device.

Furthermore, according to embodiments disclosed in the disclosure, lens modules may be disposed at positions corresponding to glasses, when the wearable electronic device is received in a receiving part of a case. Thus, although the wearable electronic device is received in the case, screens displayed on display areas by the display of the wearable electronic device may be verified through the lens module.

In addition, various effects ascertained directly or indirectly through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
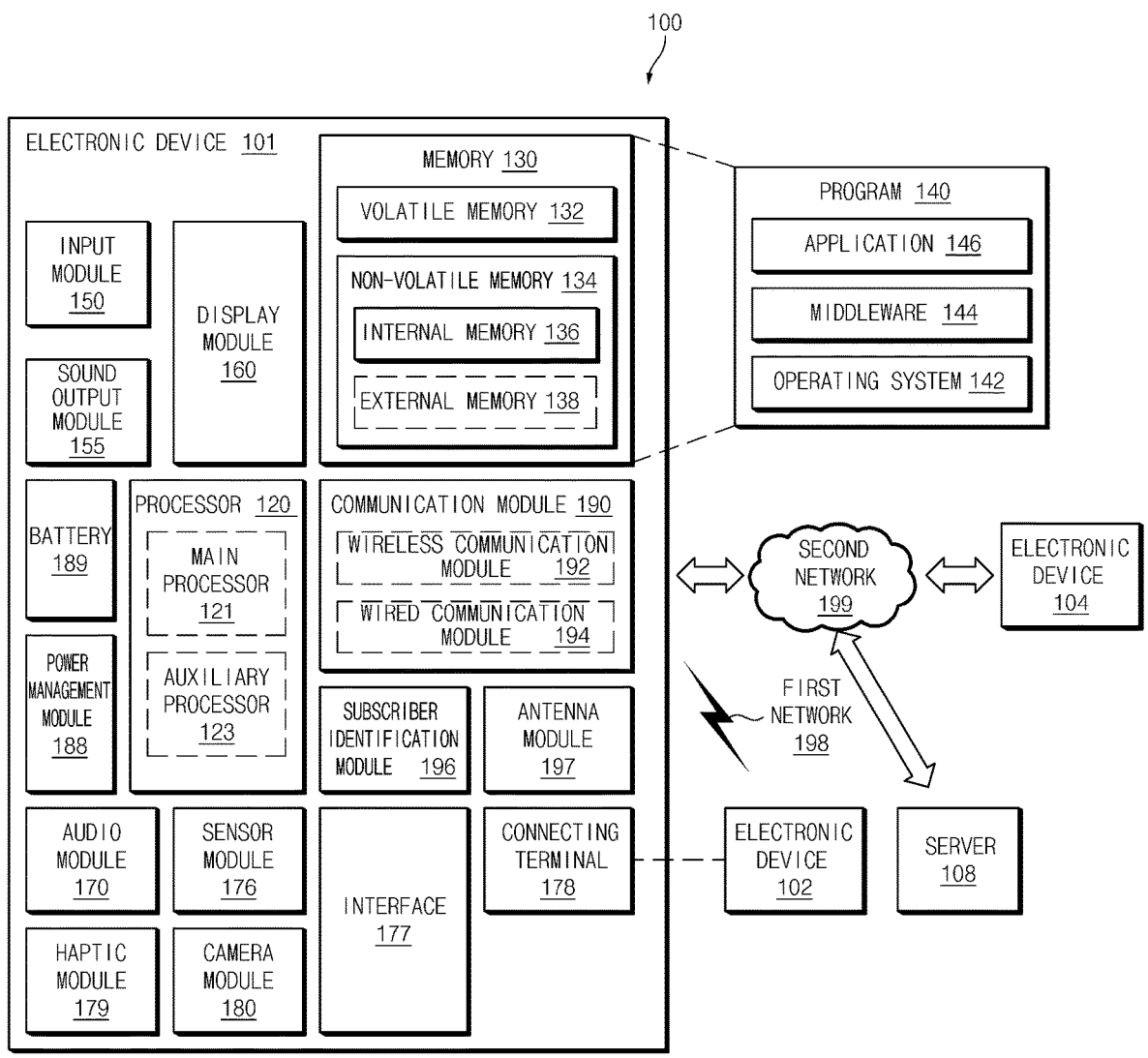
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
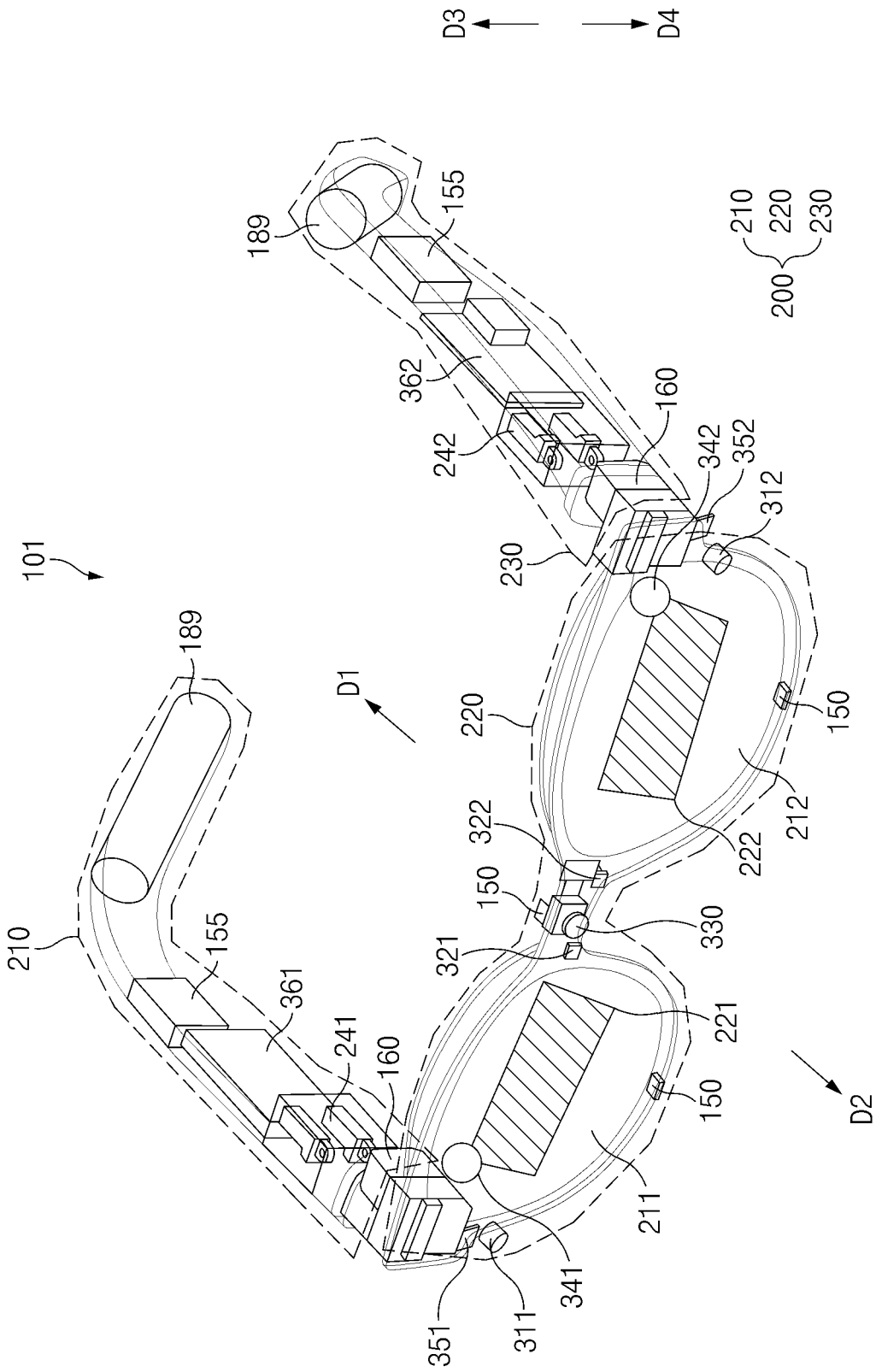
FIG. 2 is a drawing illustrating a wearable electronic device according to an embodiment of the disclosure.

FIG. 2 is a drawing illustrating a wearable electronic device according to an embodiment of the disclosure.

In an embodiment of the disclosure, the wearable electronic device 101 may be included in an electronic device 101 described based on FIG. 1. For example, the wearable electronic device 101 may include at least some of the components of the electronic device 101 of FIG. 1. The wearable electronic device 101 may be smart glasses. For example, the wearable electronic device 101 may be augmented reality (AR) glasses. However, the wearable electronic device 101 is not limited thereto, and may be a glasses-type of electronic device worn on the face of a user, for example, a virtual reality (VR) device, a mixed reality (MR) device, and/or a head mount display (HMD) device.

Referring to FIG. 2, the wearable electronic device 101 may include a housing 200 including a first housing portion 210, a second housing portion 220, and a third housing portion 230. The first housing portion 210 and the third housing portion 230 may constitute a temple of the wearable electronic device 101. The first housing portion 210 and the third housing portion 230 may have substantially the same shape. The second housing portion 220 may be located between the first housing portion 210 and the third housing portion 230. The second housing portion 220 may constitute a rim of the wearable electronic device 101.

In an embodiment of the disclosure, the wearable electronic device 101 may include at least one display module 160, glasses 211 and 212, display areas 221 and 222, first cameras 311 and 312, second cameras 321 and 322, a third camera 330, first and second sensors 341 and 342, light emitting parts 351 and 352, and PCBs 361 and 362. Furthermore, the wearable electronic device 101 may include at least one input module 150, such as a microphone, at least one sound output module 155, such as a speaker, the battery 189, and hinges 241 and 242. The wearable electronic device 101 of FIG. 2 may be one example, the shape of the wearable electronic device 101 and the component included in the wearable electronic device 101 may be added or omitted.

In an embodiment of the disclosure, the display module 160 may be substantially the same component as a display module 160 of FIG. 1. The display module 160 may include, for example, a liquid crystal display (LCD), a digital mirror device (DMD), a liquid crystal on silicon (LCoS), an organic light emitting diode (OLED), or a micro light emitting diode (LED). Although not illustrated, when the display module 160 is including one of the LCD, the DMD, or the LCoS, the electronic device 101 may include a light source which emits light to the display areas 221 and 222. In another embodiment of the disclosure, when the display module 160 is able to internally generate light, for example, when the display module 160 is including one of the OLED or the micro LED, the electronic device 101 may provide the user with a good quality virtual image, although not including a separate light source. In an embodiment of the disclosure, when the display module 160 is implemented with an OLED or a micro LED, because it is unnecessary to have a light source, the electronic device 101 may become lighter. The user may use the electronic device 101 in a state where the wearable electronic device 101 is worn on his or her face.

In an embodiment of the disclosure, the glasses 211 and 212 may be arranged on a front side of the wearable electronic device 101. The glasses 211 and 212 may be located in front of both eyes of the user, when the user is wearing the wearable electronic device 101 on his or her face. The glasses 211 and 212 may be arranged at positions facing the eyes of the user. When the user is wearing the wearable electronic device 101, he or she may see the outside through the glasses 211 and 212. The glasses 211 and 212 may be manufactured transparently or semi-transparently. The glasses 211 and 212 may be formed of a glass plate, a plastic plate, or a polymer.

In an embodiment of the disclosure, the glasses 211 and 212 may include the first glass 211 and the second glass 212.

The first glass 211 may be disposed to face a right eye of the user, and the second glass 212 may be disposed to face a left eye of the user.

In an embodiment of the disclosure, the display module 160 may display screens on the display areas 221 and 222. The display areas 221 and 222 may be made up inside the glasses 211 and 212. The display areas 221 and 222 may include the first display area 221 and the second display area 222. The first display area 221 may be made up inside the first glass 211, and the second display area 222 may be made up inside the second glass 212.

In an embodiment of the disclosure, the hinges 241 and 242 may rotatably connect the first housing portion 210 with the second housing portion 220 and may rotatably connect the second housing portion 220 with the third housing 230.

In an embodiment of the disclosure, the first cameras 311 and 312 may recognize a body of the user and/or a space. The first cameras 311 and 312 may track a direction the head of the user is facing. The first cameras 311 and 312 may detect and track a hand of the user. The first cameras 311 and 312 may recognize a space. The first cameras 311 and 312 may be 3 DoF or 6 DoF cameras. The first cameras 311 and 312 may be global shutter (GS) cameras. The first cameras 311 and 312 may have a stereo structure for body tracking and/or space recognition. The first cameras 311 and 312 may need two cameras, each of which has substantially the same specification and/or performance. The first cameras 311 and 312 may be GS cameras, each of which has no motion blur, such as rolling shutter (RS) cameras, to detect quick hand gesture and fine motion of a finger and track motion. The first cameras 311 and 312 may perform space recognition for 6 DoF and may perform a simultaneous localization and mapping (SLAM) function by means of depth image capture. The first cameras 311 and 312 may recognize a user gesture recognition function.

In an embodiment of the disclosure, the second cameras 321 and 322 may detect and track pupils. The second cameras 321 and 322 may be cameras for eye tracking (ET). The second cameras 321 and 322 may allow the center of a virtual image projected onto the wearable electronic device 101 to be located along a direction at which pupils of a wearer of the wearable electronic device 101 gaze. The second cameras 321 and 322 may be GS cameras. When the second cameras 321 and 322 are the GS cameras, they may detect pupils and may track quick pupil motion without motion blur. The second cameras 321 and 322 may be respectively installed for a left eye and a right eye. The second cameras 321 and 322 may have a stereo structure. The second cameras 321 and 322 may be including two cameras, each of which has substantially the same performance and specification.

In an embodiment of the disclosure, the third camera 330 may capture an external object (e.g., a person, a thing, and/or a background). The third camera 330 may be a camera of high resolution, such as high resolution (HR) or photo video (PV). The third camera 330 may have a function for obtaining a high quality image, for example, an auto focus (AF) function and/or an optical image stabilizer (OIS) function. The third camera 330 may be a camera with high color related performance. The third cameras 330 may be a GS camera or an RS camera.

In an embodiment of the disclosure, the first and second sensors 341 and 342 may guide light to an optical waveguide. A description will be given of operations of the first and second sensors 341 and 342 in conjunction with FIG. 4.

In an embodiment of the disclosure, light emitting parts 351 and 352 may be arranged in the second housing portion 220. The light emitting parts 351 and 352 may be arranged to face a front side of the second housing portion 220. The light emitting parts 351 and 352 may be arranged adjacent to the hinges 241 and 242. However, the light emitting parts 351 and 352 are not limited thereto, which may be arranged adjacent to the center of the second housing portion 220. The light emitting parts 351 and 352 may supplement surrounding brightness when capturing an image using the first cameras 311 and 312. When it is not easy to detect a subject to be captured because of a dark environment or mixing of several light sources and reflected light, the light emitting parts 351 and 352 may supplement surrounding brightness. The light emitting parts 351 and 352 may be used as auxiliary means for facilitating detection of eye gaze when capturing pupils using the second cameras 321 and 322. The light emitting parts 351 and 352 may be IR LEDs, each of which emits light of an infrared wavelength. For example, the light emitting parts 351 and 352 may be plural in number in the second housing portion 220.

In an embodiment of the disclosure, the PCBs 361 and 362 may be arranged in the first housing portion 210 or the third housing portion 230. The PCBs 361 and 362 may be electrically connected with a flexible PCB (FPCB). The PCBs 361 and 362 may deliver an electrical signal to modules (e.g., the first cameras 311 and 312, the second cameras 321 and 322, the third camera 330, the display module 160, the input module 150, or the sound output module 155) in the wearable electronic device 101 via the FPCB. The PCBs 361 and 362 may include the first PCB 361 and the second PCB 362. The first PCB 361 and the second PCB 362 may be electrically connected with each other. For example, an interposer may be disposed between the first PCB 361 and the second PCB 362. The first PCB 361 and the second PCB 262 may transmit and receive an electrical signal with each other.

In an embodiment of the disclosure, a first direction D1 may be a direction where inner surfaces of the glasses 211 and 212 face the eyes of the user when the user is wearing the wearable electronic device 101. For example, the first direction D1 may be an inner direction of the wearable electronic device 101. In an embodiment of the disclosure, a second direction D2 may be a direction where outer surfaces of the glasses 211 and 212 face outward when the user is wearing the wearable electronic device 101. For example, the second direction D2 may be an outer direction of the wearable electronic device 101. In an embodiment of the disclosure, a third direction D3 may be a direction where an upper portion of the wearable electronic device 101 (e.g., a region where the third camera 330 is located based on FIG. 2) when the user is wearing the wearable electronic device 101. For example, the third direction D3 may be a direction facing a direction opposite to the ground. In an embodiment of the disclosure, a fourth direction D4 may be a direction where a lower portion (e.g., a region opposite to the upper portion) of the wearable electronic device 101 when the user is wearing the wearable electronic device 101. For example, the fourth direction D4 may be a direction facing the ground.

Figure 3:
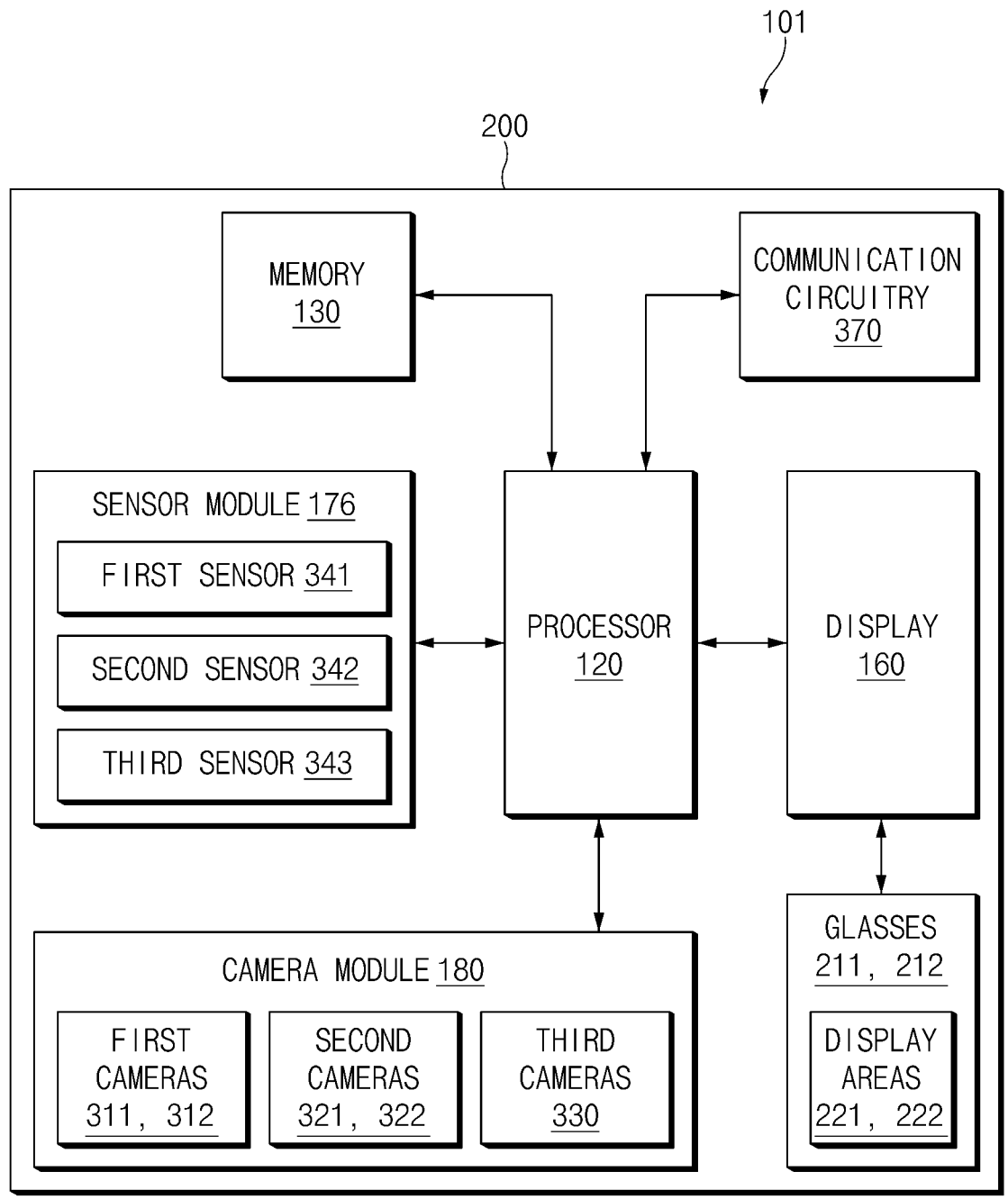
FIG. 3 is a block diagram illustrating a wearable electronic device according to an embodiment of the disclosure.

FIG. 3 is a block diagram illustrating a wearable electronic device according to an embodiment of the disclosure.

Referring to FIG. 3, the wearable electronic device 101 according to an embodiment may include a housing 200, glasses 211 and 212, a display module 160, a sensor module 176, a camera module 180, a processor 120, a memory 130, and communication circuitry 370 (e.g., a wireless communication module 192 of FIG. 1).

In an embodiment of the disclosure, the housing 200 may include a first housing portion (e.g., a first housing portion 210 of FIG. 2), a second housing portion (e.g., a second housing portion 220 of FIG. 2), and a third housing portion (e.g., a third housing portion 230 of FIG. 2).

In an embodiment of the disclosure, the glasses 211 and 212 may be surrounded by the second housing portion 220. When a user is wearing the wearable electronic device 101, the glasses 211 and 212 may allow the user to see the outside.

In an embodiment of the disclosure, the display module 160 may display screens on the glasses 211 and 212 in an inner direction and an outer direction. The display module 160 may display the screens on display areas 221 and 222 formed in the glasses 211 and 212.

In an embodiment of the disclosure, the sensor module 176 may include a first sensor 341, a second sensor 342, and a third sensor 343.

In an embodiment of the disclosure, the first sensor 341 may identify whether the user is wearing the wearable electronic device 101. When the user is wearing the wearable electronic device 101, the first sensor 341 may generate a first signal. When the user is not wearing the wearable electronic device 101, the first sensor 341 may generate a second signal. The first sensor 341 may deliver the first signal or the second signal to the processor 120. The second sensor 342 may be a proximity sensor.

In an embodiment of the disclosure, the second sensor 342 may determine a direction where the wearable electronic device 101 is placed. The direction where the wearable electronic device 101 is placed may be defined as an orientation of the wearable electronic device 101. The direction where the wearable electronic device 101 is placed may be determined with respect to the ground parallel to a landscape orientation. The direction where the wearable electronic device 101 is placed may include when the wearable electronic device 101 is in a first state and/or a second state with respect to the ground. The first state may be a state where the wearable electronic device 101 is placed in the same direction as a state where the user is wearing the wearable electronic device 101. In the first state, an upper portion of the wearable electronic device 101 may face a third direction (e.g., a third direction D3 of FIG. 2). The second state may be a state where the wearable electronic device 101 is placed in an inverted direction as compared with the state where the user is wearing the wearable electronic device 101. In the second state, the upper portion of the wearable electronic device 101 may face a fourth direction (e.g., a fourth direction D4 of FIG. 2). When the wearable electronic device 101 is in the first state, the second sensor 342 may generate a third signal. When the wearable electronic device 101 is in the second state, the second sensor 342 may generate a fourth signal. The second sensor 342 may deliver the third signal or the fourth signal to the processor 120. The second sensor 342 may be a 9-axis sensor, an XYZ-axis sensor, and/or a gyro sensor.

In an embodiment of the disclosure, the third sensor 343 may determine whether the first housing portion 210 and/or the third housing portion 230 are/is folded. For example, when the first housing portion 210 and/or the third housing portion 230 are/is folded, the first housing portion 210 and/or the third housing portion 230 may be overlapped with at least a portion of the first glass 211 and/or the second glass 212 and the wearable electronic device 101 may determine that the user has no intention to view the glasses 211 and 212 in the direction where the user is wearing the wearable electronic device 101. When the first housing portion 210 and/or the third housing portion 230 are/is folded, the third sensor 343 may generate a fifth signal. When the first housing portion 210 and the third housing portion 230 are unfolded, the third sensor 343 may generate a sixth signal. The third sensor 343 may deliver the fifth signal or the sixth signal to the processor 120. The third sensor 343 may be a hall sensor and/or a proximity sensor.

In an embodiment of the disclosure, the camera module 180 may include first cameras 311 and 312, second cameras 321 and 322, and a third camera 330.

In an embodiment of the disclosure, the first cameras 311 and 312 may track a hand gesture of the user. The first cameras 311 and 312 may recognize a space. The first cameras 311 and 312 may be GS cameras and/or RS cameras.

In an embodiment of the disclosure, the second cameras 321 and 322 may track pupils of the user. The second cameras 321 and 322 may be cameras for ET.

In an embodiment of the disclosure, the third camera 330 may capture the outside. The third camera 330 may be an HR camera or a PV camera. The third camera 330 may capture an external object, such as a person, a thing, and/or a background. The third camera 330 may be an HR camera or a PV camera. The third camera 330 may be a GS camera or an RS camera.

In an embodiment of the disclosure, the processor 120 could determine whether the user is wearing the wearable electronic device 101 by using the second cameras 321 and 322 together with the first sensor 341, or by using the second cameras 321 and 322 instead of the first sensor 341. When the second cameras 321 and 322 track pupils of the user, it may be determined that the user is wearing the wearable electronic device 101. When the pupils of the user are not detected by the second cameras 321 and 322, it may be determined that the user is not wearing the wearable electronic device 101.

In an embodiment of the disclosure, the first cameras 311 and 312 and the third camera 330 may determine a position of the user. The first cameras 311 and 312 and the third camera 330 may identify whether the user is located in front in an outer direction (e.g., a second direction D2 of FIG. 2) of the wearable electronic device 101. The first cameras 311 and 312 and the third camera 330 may calculate a distance between from the wearable electronic device 101 to the user.

In an embodiment of the disclosure, the processor 120 may be connected with the display module 160, the sensor module 176, and the camera module 180. The processor 120 may be configured to control screens displayed on display areas 221 and 222 by the display module 160 based on the state of the wearable electronic device 101. The state of the wearable electronic device 101 may include whether the wearable electronic device 101 is worn, a direction where the wearable electronic device 101 is placed, whether the first housing portion 210 and/or the third housing portion 230 are/is folded, and/or a position of the user.

In an embodiment of the disclosure, the memory 130 may store instructions for an operation of the processor 120. The instructions may cause the processor 120 to control screens displayed on the display areas 221 and 222 of the display module 160. The instructions may cause the processor 120 to control whether to output screens displayed on the display areas 221 and 222 of the display module 160, whether the displayed screen is inverted and/or reversed, brightnesses of the screens, and/or a size of content included in the screens.

In an embodiment of the disclosure, the communication circuitry 370 may establish a wireless communication connection with an electronic device (e.g., a smartphone) (e.g., an electronic device 102 or 104 of FIG. 1) different from the wearable electronic device 101 and/or a server (e.g., a server 108 of FIG. 1). The communication circuitry 370 may transmit signals and/or data, delivered from the processor 120, to the other electronic device 102 or 104 and/or the server 108. The communication circuitry 370 may deliver the signals and/or the data, received from the other electronic device 102 or 104 and/or the server 108, to the processor 120.

Figure 4:
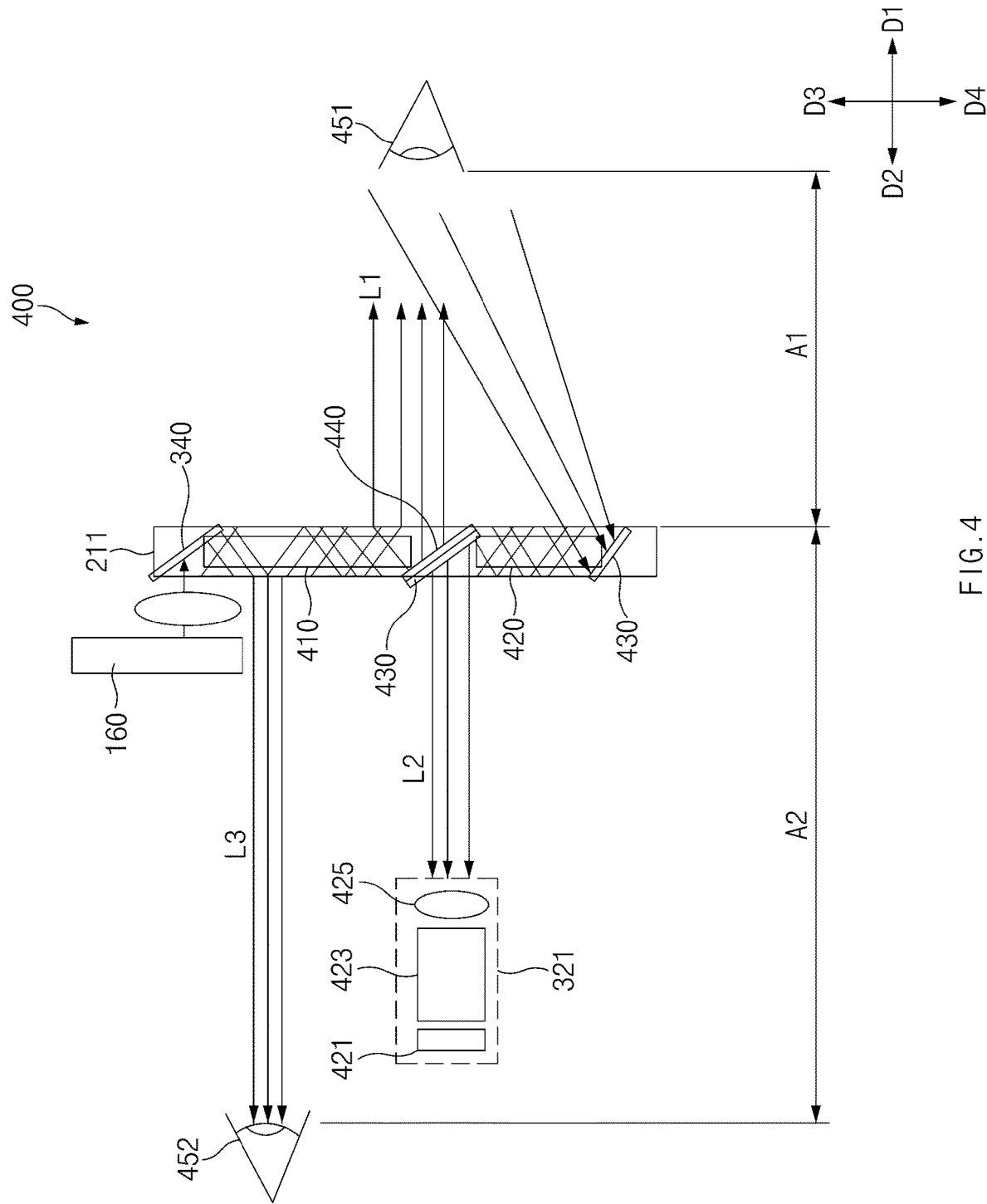
FIG. 4 is a drawing illustrating an optical structure of a wearable electronic device according to an embodiment of the disclosure.

FIG. 4 is a drawing 400 illustrating an optical structure of a wearable electronic device (e.g., a wearable electronic device 101 of FIG. 2) according to an embodiment of the disclosure.

Referring to FIG. 4, a first optical waveguide 410 may be included in a glass 211 (e.g., glasses 211 and 212 of FIG. 2). The first optical waveguide 410 may deliver light generated by the display module 160 to eyes of the user. The first optical waveguide 410 may be made of glass, plastic or polymer. A nano pattern may be formed in one surface inside or outside the first optical waveguide 410. The nano pattern may include a polygonal or curved grating structure.

In an embodiment of the disclosure, light output from the display module 160 may be incident to one end of the first optical waveguide 410 via an input optical member 340 (e.g., first and second sensors 341 and 342 of FIG. 2).

In an embodiment of the disclosure, light propagated from the inside of the first optical waveguide 410 may be provided to the user. The first optical waveguide 410 may include a free-form prism. The first optical waveguide 410 may include at least one of at least one diffractive element (e.g., a diffractive optical element (DOE) or a holographic optical element (HOE)) or a reflective element (e.g., a reflective mirror). The first optical waveguide 410 may guide incident light to eyes 451 and 452 of the user via the diffractive element or the reflective element to provide the user with the light.

In an embodiment of the disclosure, the diffractive element may include the input optical member 340 and an output optical member 440. The reflective element may include total internal reflection (TIR). For example, light emitted from the display module 160 may be guided to the first optical waveguide 410 via the input optical member 340. Light which moves in the first light waveguide 410 may be guided in the direction of the eyes 451 and 452 of the user via the output optical member 440.

In an embodiment of the disclosure, the user may look at the first glass 211, when he or she is located in a first direction D1 or a second direction D2 of the wearable electronic device 101. When the user is located in the first direction (e.g., D1 of FIG. 2) of the wearable electronic device 101, the eye 451 of the user may see first light L1. When the user is located in the second direction (e.g., D2 of FIG. 2) of the wearable electronic device 101, the eye 452 of the user may see third light L3. As the pieces of light L1 and L3 emitted in the first direction D1 and/or the second direction D2 are incident to the eyes 451 and 452 of the user, the user may see screens.

In an embodiment of the disclosure, the wearable electronic device 101 may include at least one or more light emitting parts (e.g., light emitting parts 351 and 352 of FIG. 2) arranged in a housing (e.g., a second housing portion 220 of FIG. 2). For example, the light emitting parts 351 and 352 may be IR LEDs, each of which emits light of an infrared wavelength. The light emitting parts 351 and 352 may emit light in the first direction D1 of the wearable electronic device 101. Light emitted from the light emitting parts 351 and 352 may be reflected from the eye 451 of the user located in the first direction D1 of the wearable electronic device 101 to be incident to a second optical waveguide 420 located in one region of the first glass 211.

In an embodiment of the disclosure, light propagated from the inside of the second optical waveguide 420 may be split through a beam splitter 430. At least some of the pieces of light split through the beam splitter 430 may be guided to the second camera 321 (e.g., second cameras 321 and 322 of FIG. 2). The second camera 321 may process the second light L2 guided to the second camera 321 using an ET sensor 421, an ET optic member 423, and a lens 425.

In an embodiment of the disclosure, a distance between the output optical member 440 and the eye 451 of the user located in the first direction D1 of the wearable electronic device 101 may be a first distance A1. A distance between the output optical member 440 and the eye 452 of the user located in the second direction D2 of the wearable electronic device 101 may be a second distance A2. The first distance A1 and the second distance A2 may be eye relief. The eye relief may be a distance from the output optical member 440 where the eyes 451 and 452 of the user may obtain the entire field of view (FOV). When the eyes 451 and 452 of the user are more distant from the output optical member 440 than the eye relief, the FOV of the eyes 451 and 452 of the user may be reduced. When the first distance A1 and/or the second distance A2 are/is increased, an eye box area, which is an area capable of showing the user screens displayed on display areas (e.g., display areas 221 and 222 of FIG. 3) by the display module 160, may be hidden. The eye box area may be an area where all the screens displayed on the display areas 221 and 222 by the display module 160 are input to the eyes 451 and 452 of the user.

In an embodiment of the disclosure, the first light L1 may form a first screen output in the first direction D1. The first screen may face the eye 451 of the user located in an inner direction which is the first direction D1 of the wearable electronic device 101. The third light L3 may form a second screen output in the second direction D2. The second screen may face the eye 452 of the user located in an outer direction which is the second direction D2 of the wearable electronic device 101.

Figure 5:
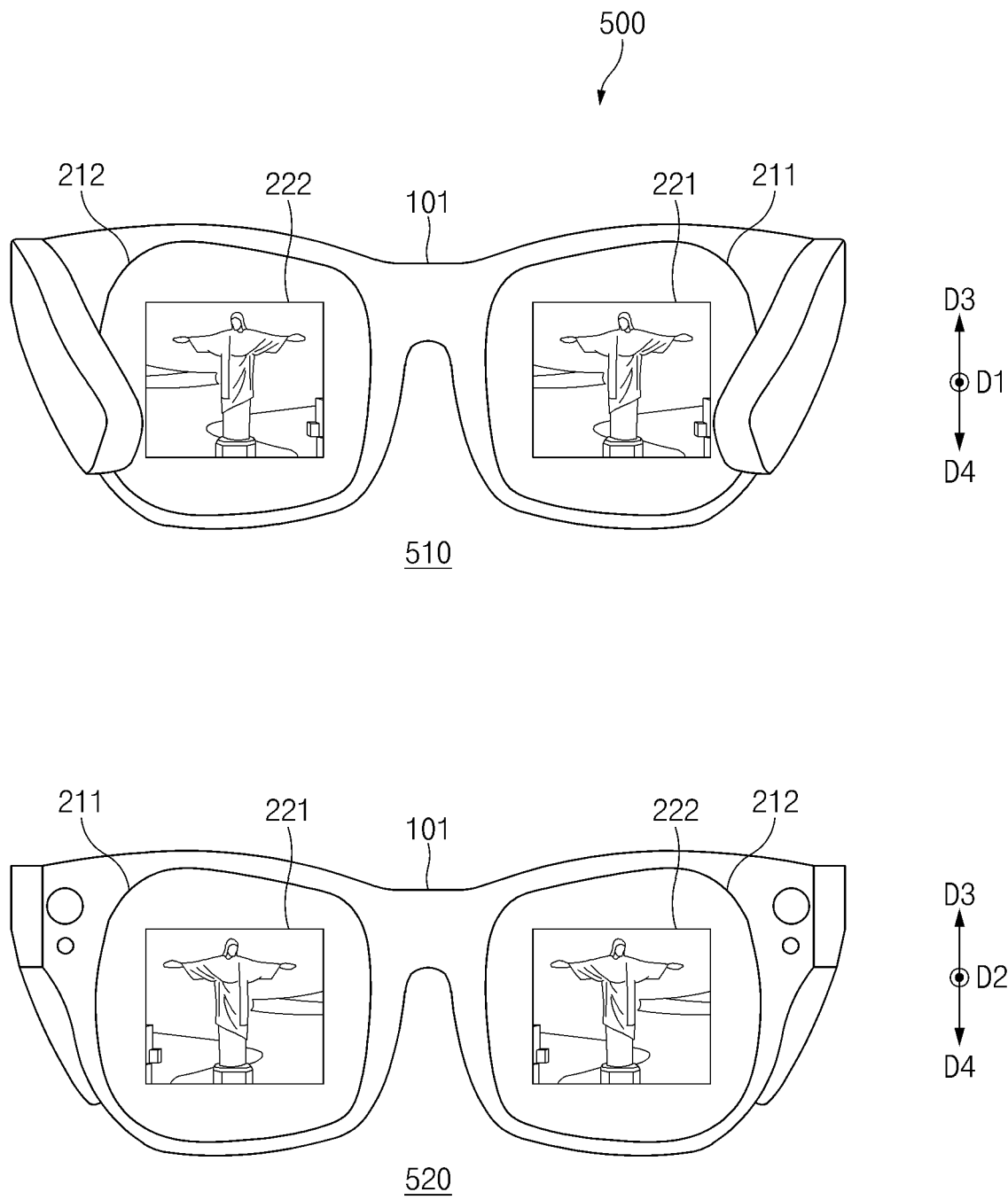
FIG. 5 is a drawing illustrating screens displayed on display areas by a display of a wearable electronic device according to an embodiment of the disclosure.

FIG. 5 is a drawing 500 illustrating screens displayed on display areas 221 and 222 by a display (e.g., a display module 160 of FIG. 3) of a wearable electronic device 101 according to an embodiment of the disclosure.

In an embodiment of the disclosure, the display module 160 may display screens on the display areas 221 and 222. The display areas 221 and 222 may be formed in areas in transparent glasses 211 and 212.

Referring to FIG. 5, when a user sees the wearable electronic device 101 in a first direction D1 (510), a first screen may be displayed in the first direction D1 of the wearable electronic device 101 on the display areas 221 and 222. When the user sees the wearable electronic device 101 in a second direction D1 (520), a second screen may be displayed in the second direction D2 of the wearable electronic device 101 on the display areas 221 and 222.

In an embodiment of the disclosure, when the wearable electronic device 101 is an augmented reality (AR) glass, due to characteristics of the waveguide, a screen configured with a virtual image may be seen in the first direction D1, which is an inner direction of the wearable electronic device 101, and the second direction D2, which is an outer direction of the wearable electronic device 101. When the user is wearing the wearable electronic device 101, in the first direction D1, he or she may see screens to be originally displayed on the display module 160. When the user is not wearing the wearable electronic device 101 and sees the display areas 221 and 222 in a state where he or she is located outside the wearable electronic device 101, he or she may see a reversed screen. A processor (e.g., a processor 120 of FIG. 1) of the wearable electronic device 101 may control output directions of the screens displayed on the display areas 221 and 222, whether the screens are inverted or reversed, forms of the screens, sizes of the screens, and/or brightnesses of the screens.

Figure 6:
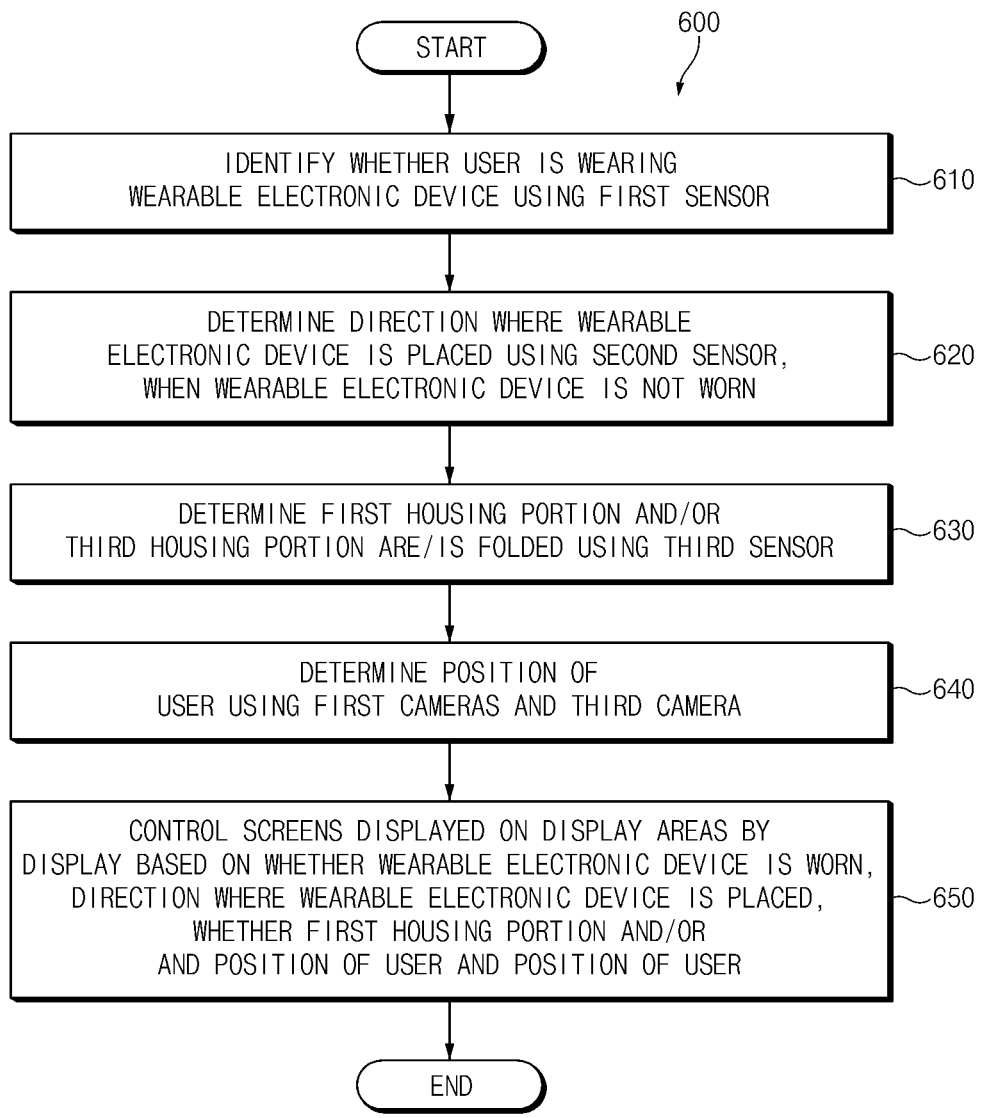
FIG. 6 is a flowchart illustrating a method for controlling a display of a wearable electronic device according to an embodiment of the disclosure.

FIG. 6 is a flowchart 600 illustrating a method for controlling a display (e.g., a display module 160 of FIG. 3) of a wearable electronic device (e.g., a wearable electronic device 101 of FIG. 3) according to an embodiment of the disclosure.

Referring to FIG. 6, in operation 610, a processor (e.g., a processor 120 of FIG. 3) of the wearable electronic device 101 may identify whether a user is wearing the wearable electronic device 101 using a first sensor (e.g., a first sensor 341 of FIG. 3). For example, when the user is wearing the wearable electronic device 101, the processor 120 may receive a first signal from the first sensor 341. For another example, when the user is not wearing the wearable electronic device 101, the processor 120 may receive a second signal from the first sensor 341. The processor 120 may identify whether the user is wearing the wearable electronic device 101 or whether the user is not wearing the wearable electronic device 101, based on a type of the signal received from the first sensor 341. The processor 120 may identify whether the user is wearing the wearable electronic device 101 using second cameras (e.g., second cameras 321 and 322 of FIG. 3) together with the first sensor 341 or rather than the first sensor 341.

In operation 620, the processor 120 of the wearable electronic device 101 according to an embodiment may determine a direction where the wearable electronic device 101 is placed using a second sensor (e.g., a second sensor 342 of FIG. 3), when the wearable electronic device 101 is not worn. For example, when the wearable electronic device 101 is in a first state, the processor 120 may receive a third signal from the second sensor 342. The first state may be a state where the wearable electronic device 101 is placed in the same direction as a state where the user is wearing the wearable electronic device 101. In the first state, an upper portion of the wearable electronic device 101 may face a third direction (e.g., a third direction D3 of FIG. 2). For another example, when the wearable electronic device 101 is in a second state, the processor 120 may receive a fourth signal from the second sensor 342. The second state may be a state where the wearable electronic device 101 is placed in an inverted direction as compared with the state where the user is wearing the wearable electronic device 101. In the second state, the upper portion of the wearable electronic device 101 may face a fourth direction (e.g., a fourth direction D4 of FIG. 2). The processor 120 may determine whether the wearable electronic device 101 is in the first state or whether the wearable electronic device 101 is in the second state, based on a type of the signal received from the second sensor 342.

In operation 630, the processor 120 of the electronic device 101 according to an embodiment may determine whether a first housing portion (e.g., a first housing portion 210 of FIG. 2) and/or a third housing portion (e.g., a third housing portion 230 of FIG. 2) of the wearable electronic device 101 are/is folded using a third sensor (e.g., a third sensor 343 of FIG. 3). For example, when the first housing portion 210 and/or the third housing portion 230 are/is folded, the processor 120 may receive a fifth signal from the third sensor 343. For another example, when the first housing portion 210 and the third housing portion 230 are unfolded, the processor 120 may receive a sixth signal from the third sensor 343. The processor 120 may determine whether the first housing portion 210 and/or the third housing portion 230 are/is folded or whether the first housing portion 210 and the third housing portion 230 are unfolded, based on a type of the signal received from the third sensor 343.

In operation 640, the processor 120 of the electronic device 101 according to an embodiment may determine a position of the user using first cameras (e.g., first cameras 311 and 312 of FIG. 3) and a third camera (e.g., a third camera 330 of FIG. 3). The processor 120 may identify whether the user is located in a second direction (e.g., a second direction D2 of FIG. 2) of the wearable electronic device 101, using the first cameras 311 and 312 and the third camera 330. The processor 120 may calculate a distance between from the wearable electronic device 101 to the user using the first cameras 311 and 312 and the third camera 330.

In operation 650, the processor 120 of the wearable electronic device 101 according to an embodiment may control screens displayed on display areas (e.g., display areas 221 and 222 of FIG. 3) by the display module 160, based on whether the wearable electronic device 101 is worn, the direction where the wearable electronic device 101 is placed, whether the first housing portion 210 and/or the third housing portion 230 are/is folded, and/or the position of the user. The processor 120 may process whether the wearable electronic device 101 is worn, the direction where the wearable electronic device 101 is placed, whether the first housing portion 210 and/or the third housing portion 230 are/is folded, and/or the position of the user as data associated with the state of the wearable electronic device 101. The processor 120 may control output directions of the screens displayed on the display areas (e.g., the display areas 221 and 222 of FIG. 3) by the display module 160, whether the screens are inverted or reversed, forms of the screens, sizes of the screens, and/or brightnesses of the screens, based on the state of the wearable electronic device 101.

Figure 7:
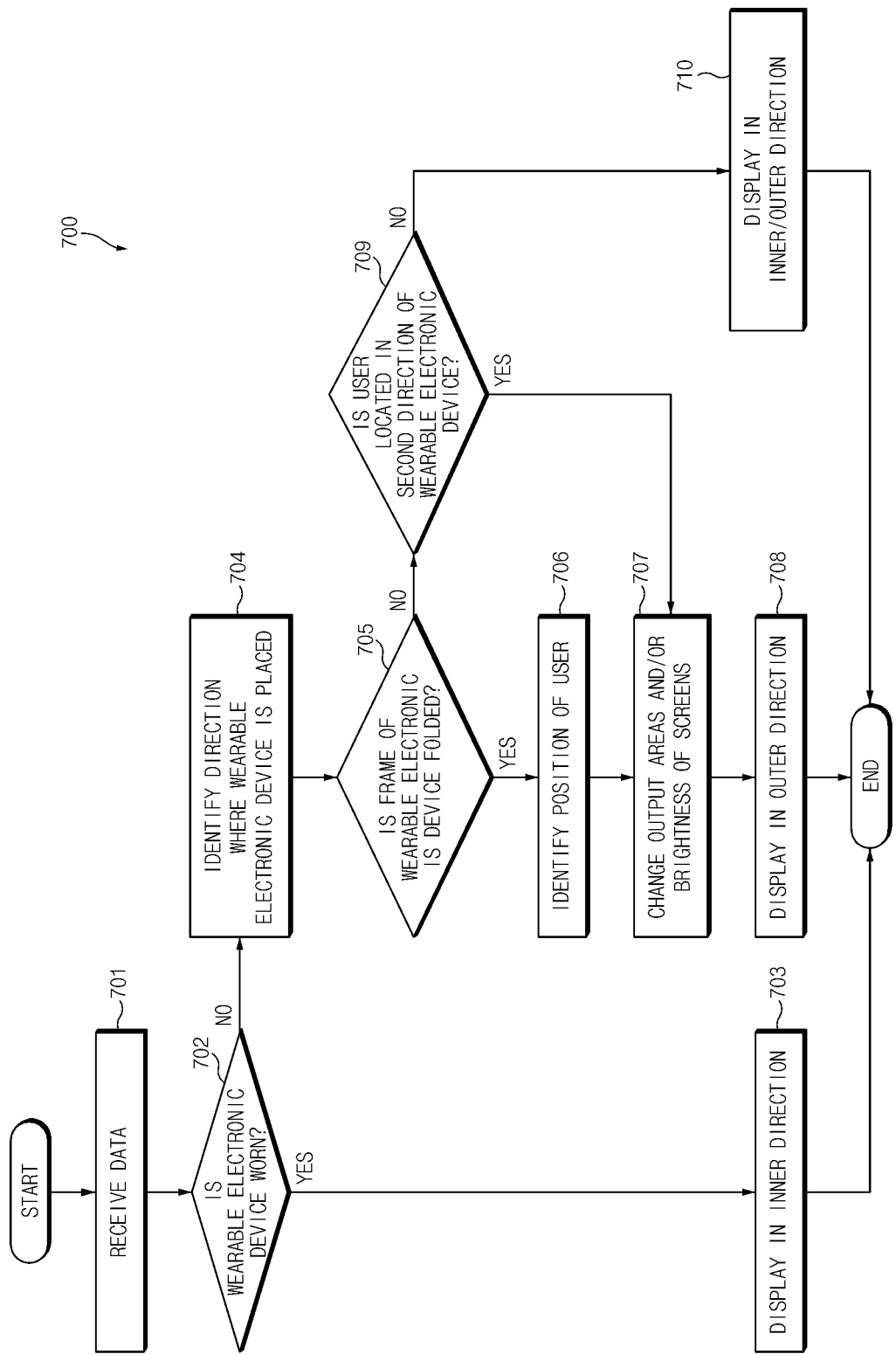
FIG. 7 is a flowchart illustrating a method for displaying screens on display areas in a display of a wearable electronic device according to an embodiment of the disclosure.

FIG. 7 is a flowchart 700 illustrating a method for displaying screens on display areas (e.g., display areas 221 and 222 of FIG. 3) in a display (e.g., a display module 160 of FIG. 3) of a wearable electronic device (e.g., a wearable electronic device 101 of FIG. 3) according to an embodiment of the disclosure. For example, the wearable electronic device 101 may be an augmented reality (AR) glass.

Referring to FIG. 7, in operation 701, a processor (e.g., a processor 120 of FIG. 3) of the wearable electronic device 101 according to an embodiment may receive data. The processor 120 may receive data transmitted from a host device, such as a smartphone, a tablet, and/or a notebook. For example, the data may be data of a type supported by the wearable electronic device 101, for example, image data or text data.

In operation 702, the processor 120 according to an embodiment may identify whether the wearable electronic device 101 is worn. The processor 120 may detect whether a user is wearing the wearable electronic device 101. For example, when receiving data periodically or from the host device, the processor 120 may detect whether the wearable electronic device 101 is worn using a first sensor (e.g., a first sensor 341 of FIG. 3). When the user is wearing the wearable electronic device 101 (YES in operation 702), the processor 120 may proceed to operation 703. When the user is not wearing the wearable electronic device 101 (NO in operation 702), the processor 120 may proceed to operation 704.

In operation 703, the processor 120 according to an embodiment may display screens in an inner direction (e.g., a first direction D1 of FIG. 2). When the user is wearing the wearable electronic device 101, the processor 120 may determine that the wearable electronic device 101 is used. The processor 120 may display the screens in the inner direction (e.g., the first direction D1 of FIG. 2) which is a direction where the user exists. The processor 120 may control the display module 160 to display the screens in the inner direction (e.g., the first direction D1 of FIG. 2).

In operation 704, the processor 120 according to an embodiment may identify a direction where the wearable electronic device 101 is placed. When the user is not wearing the wearable electronic device 101, the processor 120 may determine a direction where the wearable electronic device 101 is placed using a second sensor (e.g., a second sensor 342 of FIG. 3). The processor 120 may set directions of the screens output on display areas 221 and 222 by the display module 160 depending on the direction the wearable electronic device 101 is placed.

In an embodiment of the disclosure, when the wearable electronic device 101 is in a first state where it is placed in the same direction as a state where the user is wearing the wearable electronic device 101, the processor 120 may maintain vertical directions of the output screens. When the wearable electronic device 101 is in a second state where it is placed in an inverted direction as compared with the state where the user is wearing the wearable electronic device 101, the processor 120 may invert the vertical directions of the output screens. When the processor 120 is in the second state while performing operation 704 of detecting the direction where the wearable electronic device 101 is placed, the processor 120 may invert the vertical direction of the output screen. However, the processor 120 is not limited thereto, which may invert the vertical direction of the output screen, when the processor 120 is in the second state while performing operation 708 or 710 of displaying the screen after proceeding with operation 704.

In operation 705, the processor 120 according to an embodiment may identify whether a frame (e.g., a first housing portion 210 and/or a third housing portion 230 of FIG. 2) of the wearable electronic device 101 is folded. The processor 120 may determine that the user identifies screens in an outer direction (e.g., a second direction D2 of FIG. 2) when the frame of the wearable electronic device 101 is folded in a state where the user is not wearing the wearable electronic device 101. The processor 120 may determine that the user identifies the screens in an inner direction (e.g., a first direction D1 of FIG. 2) or the outer direction (e.g., the second direction D2 of FIG. 2) of the wearable electronic device 101 when the frame of the wearable electronic device 101 is unfolded in the state where the user is not wearing the wearable electronic device 101. When the frame of the wearable electronic device 101 is folded (YES in operation 705), the processor 120 may proceed to operation 706. When the frame of the wearable electronic device 101 is unfolded (NO in operation 705), the processor 120 may proceed to operation 709.

In operation 706, the processor 120 according to an embodiment may identify a position of the user. When receiving data in the state where the frame of the wearable electronic device 101 is folded, the processor 120 may identify the position of the user with respect to the wearable electronic device 101. The processor 120 may identify a distance between the wearable electronic device 101 and the user using first cameras (e.g., first cameras 311 and 312 of FIG. 3) and a third camera (e.g., a third camera 330 of FIG. 3). The processor 120 may identify whether the face of the user is located at any of upper, lower, right, and left sides with respect to the wearable electronic device 101 using the first cameras 311 and 312 and the third camera 330.

In operation 707, the processor 120 according to an embodiment may change output areas and/or brightnesses of the screens. The processor 120 may adjust the output areas of the screens depending on the distance between the wearable electronic device 101 and the user. The processor 120 may adjust the brightnesses of the screens depending on the distance between the wearable electronic device 101 and the user.

In operation 708, the processor 120 according to an embodiment may display the screens in an outer direction (e.g., a second direction D2 of FIG. 2). When the frame of the wearable electronic device 101 is folded in a state where the user is not wearing the wearable electronic device 101, the processor 120 may set output areas and/or brightnesses of the screens depending on the position of the user and may control the display module 160 to display the screens in the outer direction (e.g., the second direction D2 of FIG. 2).

In an embodiment of the disclosure, the processor 120 may be configured to reverse and display the screens when displaying the screens in the outer direction (e.g., the second direction D2 of FIG. 2). The processor 120 may control the display module 160 to reverse and display the screens when displaying the screens in the outer direction (e.g., the second direction D2 of FIG. 2). When the user identifies the screens displayed in the outer direction (e.g., the second direction D2 of FIG. 2), the screens may be reversed as compared with identifying the screens displayed in the inner direction (e.g., the first direction D1 of FIG. 2). When reversing and displaying the screens when displaying the screens in the outer direction (e.g., the second direction D2 of FIG. 2), the user may see the same screens as screens internally identified.

In an embodiment of the disclosure, when the user is not located in the outer direction (e.g., the second direction D2 of FIG. 2) of the wearable electronic device 101, the processor 120 may control the display module 160 to output the screens in the outer direction (e.g., the second direction D2 of FIG. 2) without changing a separate screen setting.

In an embodiment of the disclosure, for the wearable electronic device 101 in form of a head mounted display (HMD) rather than in the form of glasses, the operation where the frame is folded may be omitted. The processor 120 may determine whether the wearable electronic device 101 in the form of the HMD is worn. When the user is not wearing the wearable electronic device 101 in the form of the HMD, the processor 120 may omit operation 705 and may perform operations 704, 706, 707, and 708. The processor 120 may control the display module 160 such that the wearable electronic device 101 in the form of the HMD displays screens in the outer direction (e.g., the second direction D2 of FIG. 2).

In operation 709, the processor 120 according to an embodiment may identify whether the user is located in the second direction D2 of the wearable electronic device 101. The processor 120 may identify whether the user is located in the second direction D2 of the wearable electronic device 101 using the first cameras 311 and 312 and/or the third camera (e.g., a third camera 330 of FIG. 3). When the user is located in the second direction D2 of the wearable electronic device 101 (YES in operation 709), the processor 120 may proceed to operation 707. When the user is not located in the second direction D2 of the wearable electronic device 101 (NO in operation 709), the processor 120 may proceed to operation 710.

In operation 710, the processor 120 according to an embodiment may respectively display the screens in the inner direction (e.g., the first direction D1 of FIG. 2) and the outer direction (e.g., the second direction D2 of FIG. 2). When it is unable to identify whether the user is located in any of the inside and/or the outside of the wearable electronic device 101, the processor 120 may control the display module 160 to respectively display the screens in the inner direction (e.g., the first direction D1 of FIG. 2) and the outer direction (e.g., the second direction D2 of FIG. 2). The user may identify the screens in any of the inner direction (e.g., the first direction D1 of FIG. 2) and the outer direction (e.g., the second direction D2 of FIG. 2). When the user is not located in the outer direction (e.g., the second direction D2 of FIG. 2) of the wearable electronic device 101, in operation 710, the processor 120 according to another embodiment may control the display module 160 to display the screens in only the inner direction (e.g., the first direction D1 of FIG. 2). When the user is not located in the outer direction (e.g., the second direction D2 of FIG. 2) of the wearable electronic device 101, in operation 710, the processor 120 according to another embodiment may control the display module 160 not to display the screens.

According to an embodiment of the disclosure, in performing operation 708 or operation 710, when it is determined that the user is not located in the outer direction (e.g., the second direction D2 of FIG. 2) of the wearable electronic device 101 or within a specified angle during a specified time using the first cameras 311 and 312 and the third camera 330, the processor 120 may control the display module 160 not to display the screens.

Figure 8:
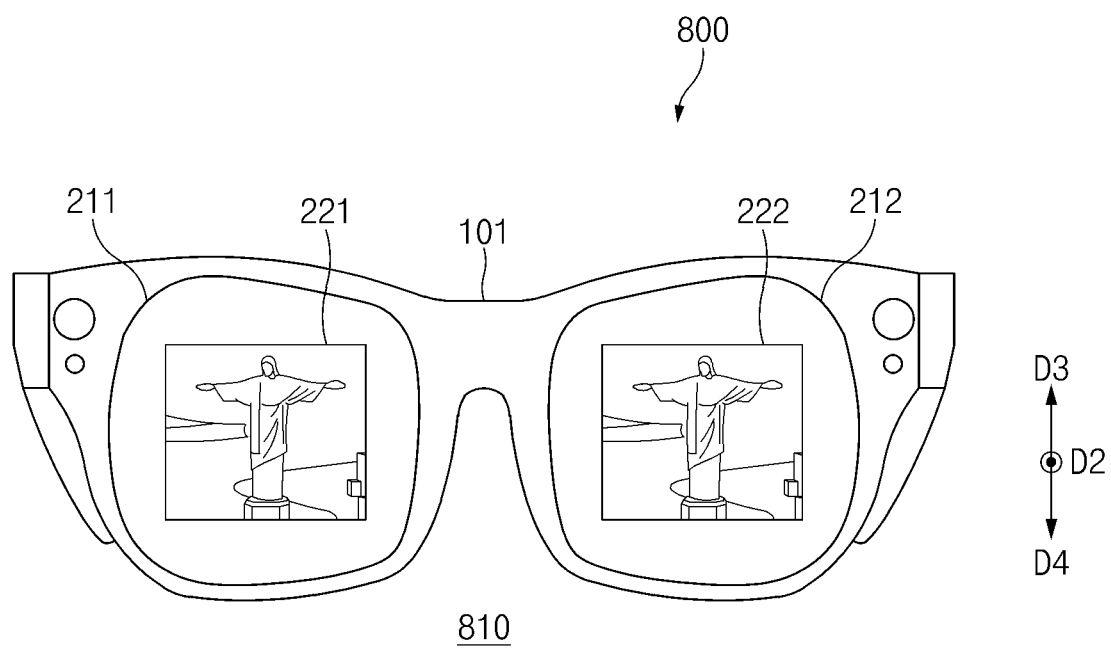
FIG. 8 is a drawing illustrating screens displayed on display areas by a display of a wearable electronic device according to an embodiment of the disclosure.
Figure 8:
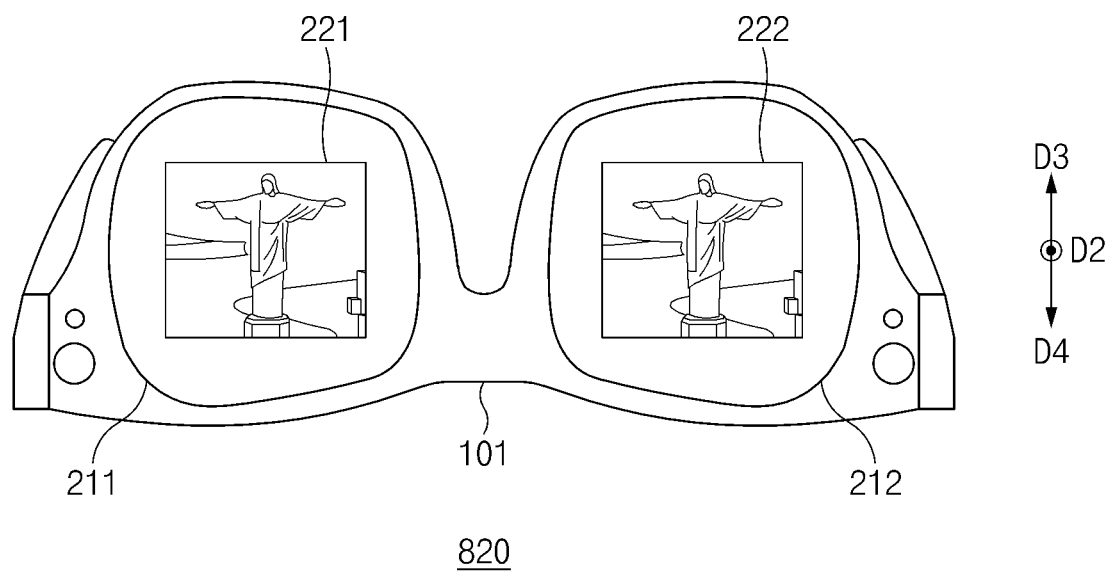

FIG. 8 is a drawing 800 illustrating screens displayed on display areas 221 and 222 by a display (e.g., a display module 160 of FIG. 3) of a wearable electronic device 101 according to an embodiment of the disclosure.

In an embodiment of the disclosure, a processor (e.g., a processor 120 of FIG. 3) of the wearable electronic device 101 may determine a direction where the wearable electronic device 101 is placed using a second sensor (e.g., a second sensor 342 of FIG. 3). The second sensor 342 may be an inertial measurement unit (IMU) sensor and/or a magnetic sensor.

In an embodiment of the disclosure, the processor (e.g., the processor 120 of FIG. 3) of the wearable electronic device 101 may identify a position of a user using first cameras (e.g., first cameras 311 and 312 of FIG. 3) and a third camera (e.g., a third camera 330 of FIG. 3). For example, the wearable electronic device 101 may identify that the user is located in a second direction (e.g., a second direction D2) of the wearable electronic device 101.

In an embodiment of the disclosure, the processor 120 may set directions of screens output on the display module 160 based on a direction the wearable electronic device 101 is placed. The processor 120 may determine the direction where the wearable electronic device 101 is placed with respect to the ground parallel to a landscape orientation.

Referring to FIG. 8, when the wearable electronic device 101 is in a second state 820 with respect to the ground, the processor 120 may control the display module 160 to invert and display screens. When the wearable electronic device 101 is in a first state 810, the processor 120 may control such that the display module 160 reverses and outputs original screens on display areas 221 and 222. When the wearable electronic device 101 is in the second state, the processor 120 may control such that the display module 160 reverses and inverts the original screens and outputs the reversed and inverted screens on the display areas 221 and 222. When the processor 120 controls the screens output on the display module 160 with regard to the direction where the wearable electronic device 101 is placed, the user may easily identify the screens irrespective of the direction where the wearable electronic device 101 is placed.

Figure 9:
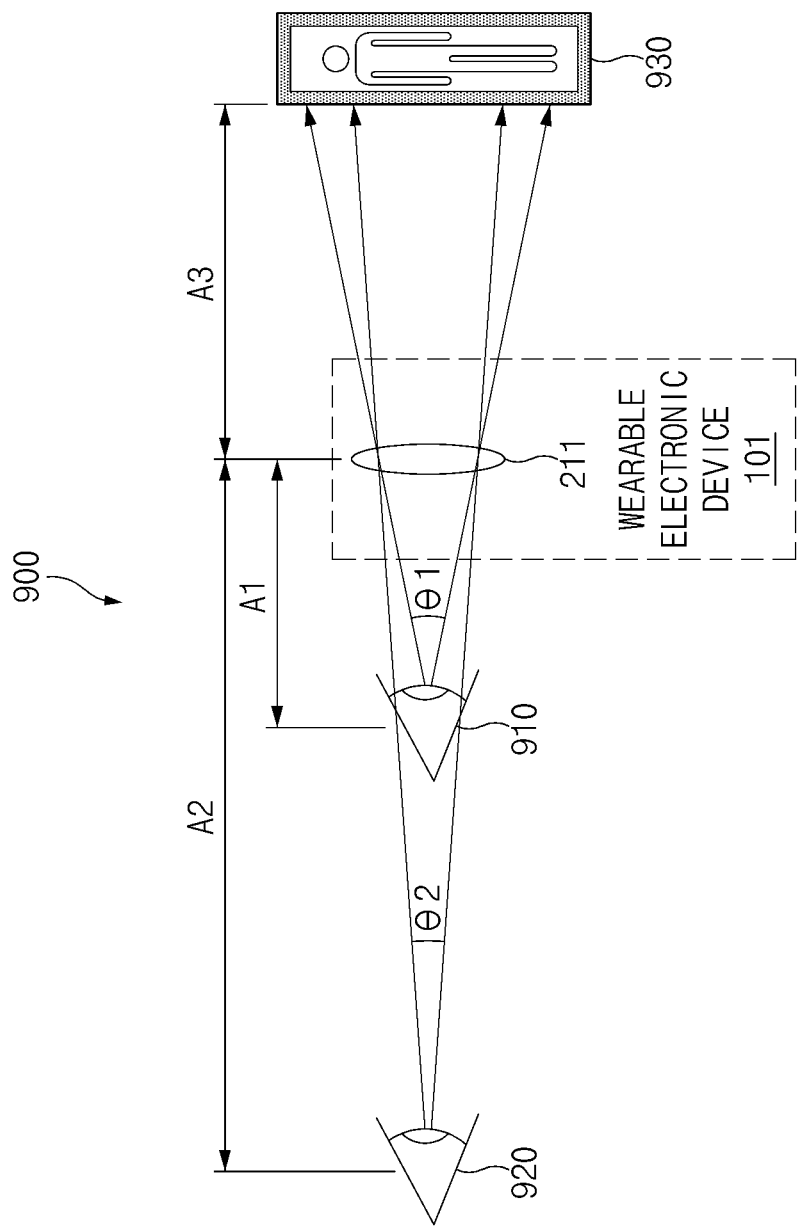
FIG. 9 is a drawing illustrating an appearance in which a user identifies a wearable electronic device according to an embodiment of the disclosure.

FIG. 9 is a drawing 900 illustrating an appearance in which a user identifies a wearable electronic device 101 according to an embodiment of the disclosure.

Referring to FIG. 9, when the user is wearing the wearable electronic device 101, an eye 910 of the user may see a first glass 211 of the wearable electronic device 101 in a field of view (FOV) θ1. For example, the eye 910 of the user and the glass 911 may have a first distance A1. When the user is wearing the wearable electronic device 101, a virtual image position 930 may be present to be spaced apart from the wearable electronic device 101 at a third distance A3. The third distance A3 may vary with a curvature of the first glass 211. For example, the third distance A3 may be greater than or equal to about 1 M and be less than or equal to about 2 M.

In an embodiment of the disclosure, when the user is spaced apart from the wearable electronic device 101 in a state where the user is not wearing the wearable electronic device 101, the eye 920 of the user may have a second distance A2 from the first glass 211 of the wearable electronic device 101. When the user is spaced apart from the wearable electronic device 101 in the state where the user is not wearing the wearable electronic device 101, the eye 920 of the user may see the first glass 211 of the wearable electronic device 101 in a second FOV θ2. The second FOV θ2 may be less than the first FOV θ1.

In an embodiment of the disclosure, when a position of the view the user is looking at changes, a shape of a virtual image capable of being viewed at the virtual image position 930 may change. When the user is spaced apart from the wearable electronic device 101 in the state where the user is not wearing the wearable electronic device 101, a range where it is able to view a virtual image at the virtual image position 930 may be more reduced than when the user is wearing the wearable electronic device 101.

In an embodiment of the disclosure, when the second distance A2 which is a distance between the wearable electronic device 101 and the user (e.g., a position of the user's gaze) changes, an eye relief position may change and an eye box area which is an area capable of showing the user screens of the display module 160 may change. The eye box area may be an area where the user may identify all the screens displayed on display areas 221 and 222 by the display module 160.

Figure 10:
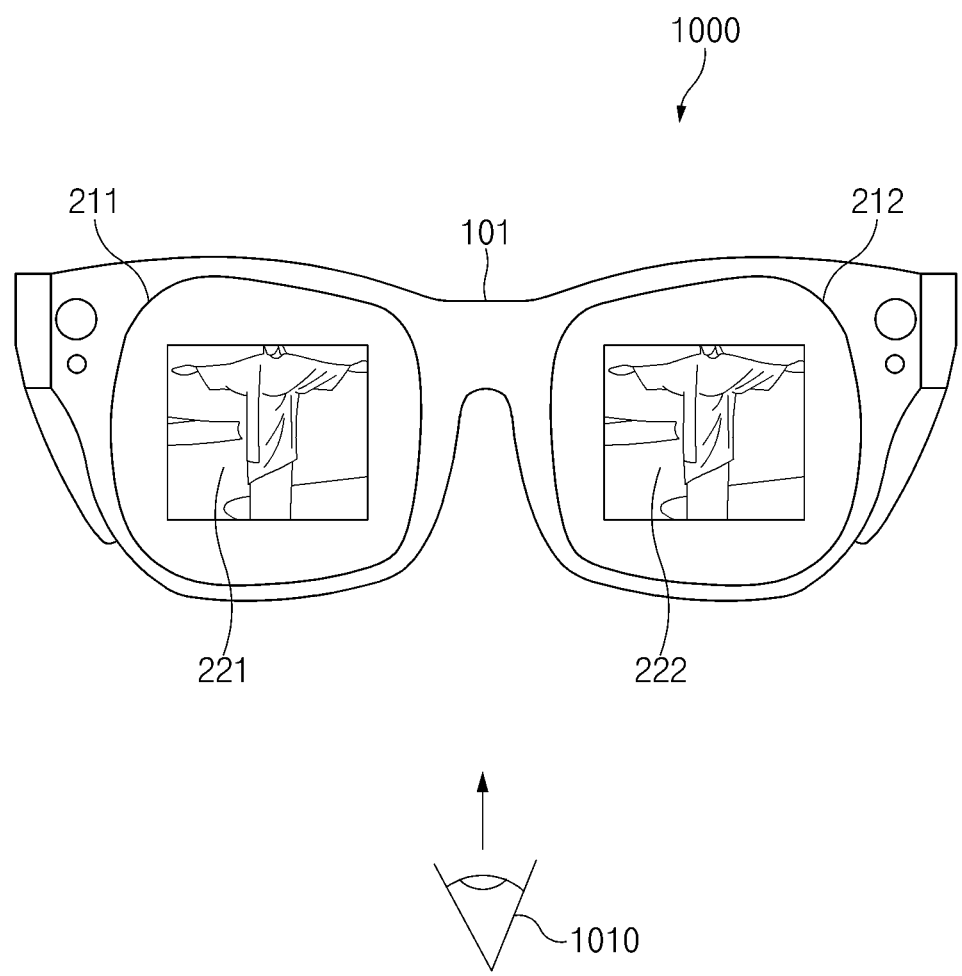
FIG. 10 is a drawing illustrating screens displayed on display areas by a display of a wearable electronic device according to an embodiment of the disclosure.

FIG. 10 is a drawing 1000 illustrating screens displayed on display areas 221 and 222 by a display (e.g., a display module 160 of FIG. 3) of a wearable electronic device 101 according to an embodiment of the disclosure.

In an embodiment of the disclosure, screens of the wearable electronic device 101 may configure eye box areas (e.g., a first distance A1 of FIG. 4) to correspond to when the user is wearing the wearable electronic device 101.

Referring to FIG. 10, a user 1010 may be spaced apart from the wearable electronic device 101 in a state where the user 1010 is not wearing the wearable electronic device 101 to identify screens. When the user is spaced apart from the wearable electronic device 101 in the state where the user is not wearing the wearable electronic device 101 to identify the screens, eye box areas showing virtual screens may be reduced. When the distance between the wearable electronic device 101 and the user increases and the eye box areas are reduced, partial areas of the screens may be zoomed in to be seen. When the partial areas of the screens displayed on the display areas 221 and 222 are zoomed in to be seen, at least a portion of content displayed on the screens may fail to be visually seen to the user.

Figure 11:
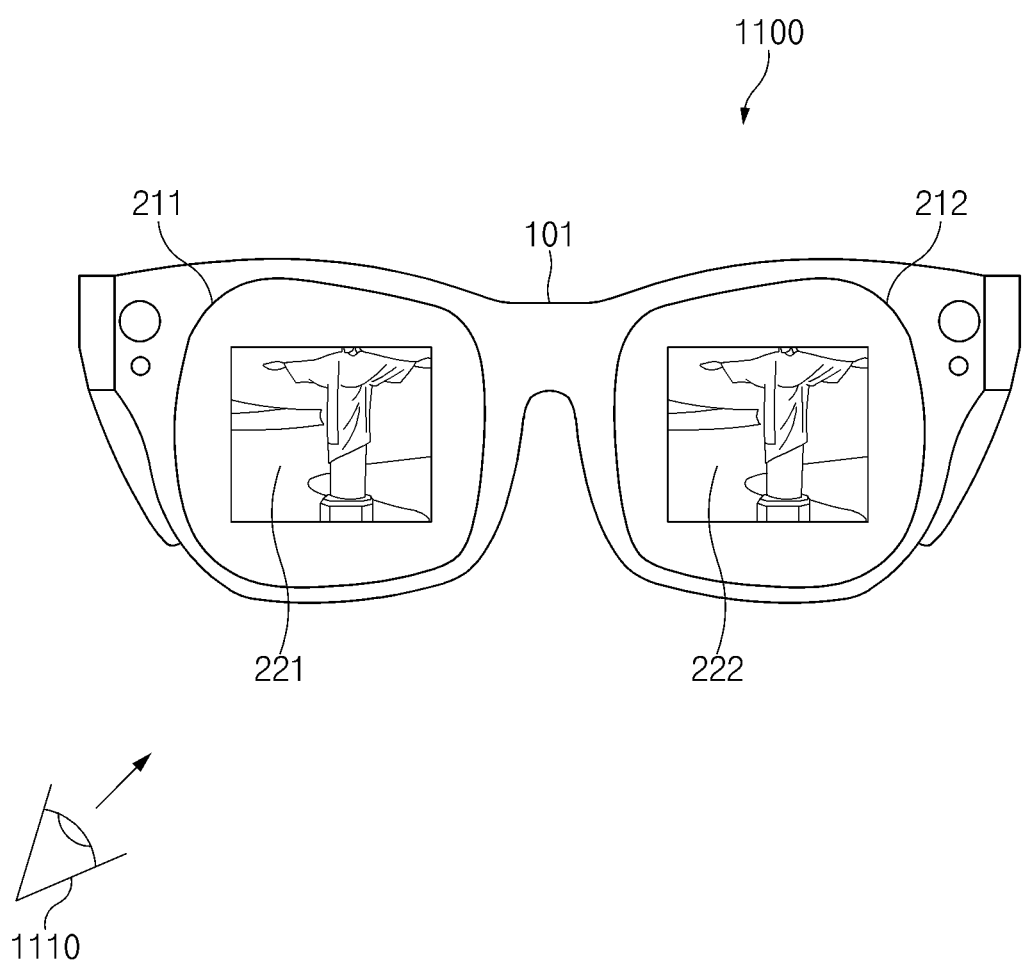
FIG. 11 is a drawing illustrating screens displayed on display areas by a display of a wearable electronic device according to an embodiment of the disclosure.

FIG. 11 is a drawing 1100 illustrating screens displayed on display areas 221 and 222 by a display (e.g., a display module 160 of FIG. 3) of a wearable electronic device 101 according to an embodiment of the disclosure.

Referring to FIG. 11, a user 1110 may verify screens at a position tilted from the wearable electronic device 101 in a state where the user 1110 is not wearing the wearable electronic device 101.

In an embodiment of the disclosure, when the user identifies the screens at the position tilted with respect to an outer direction (e.g., a second direction D2 of FIG. 2), eye box areas may lean to one corner of the display areas 221 and 222. Furthermore, partial areas of the screens may be zoomed in to be seen. Thus, the screens zoomed in on the corner portions to which the eye box areas lean may be seen. When the screens zoomed in on the corner portions to which the eye box areas lean are seen, at least a portion of content displayed on the screens may fail to be visually seen to the user. For example, at least a portion in a corner opposite to the corner to which the eye box areas lean in content included in the screens displayed on display areas 221 and 222 may fail to be visually seen to the user.

Figure 12:
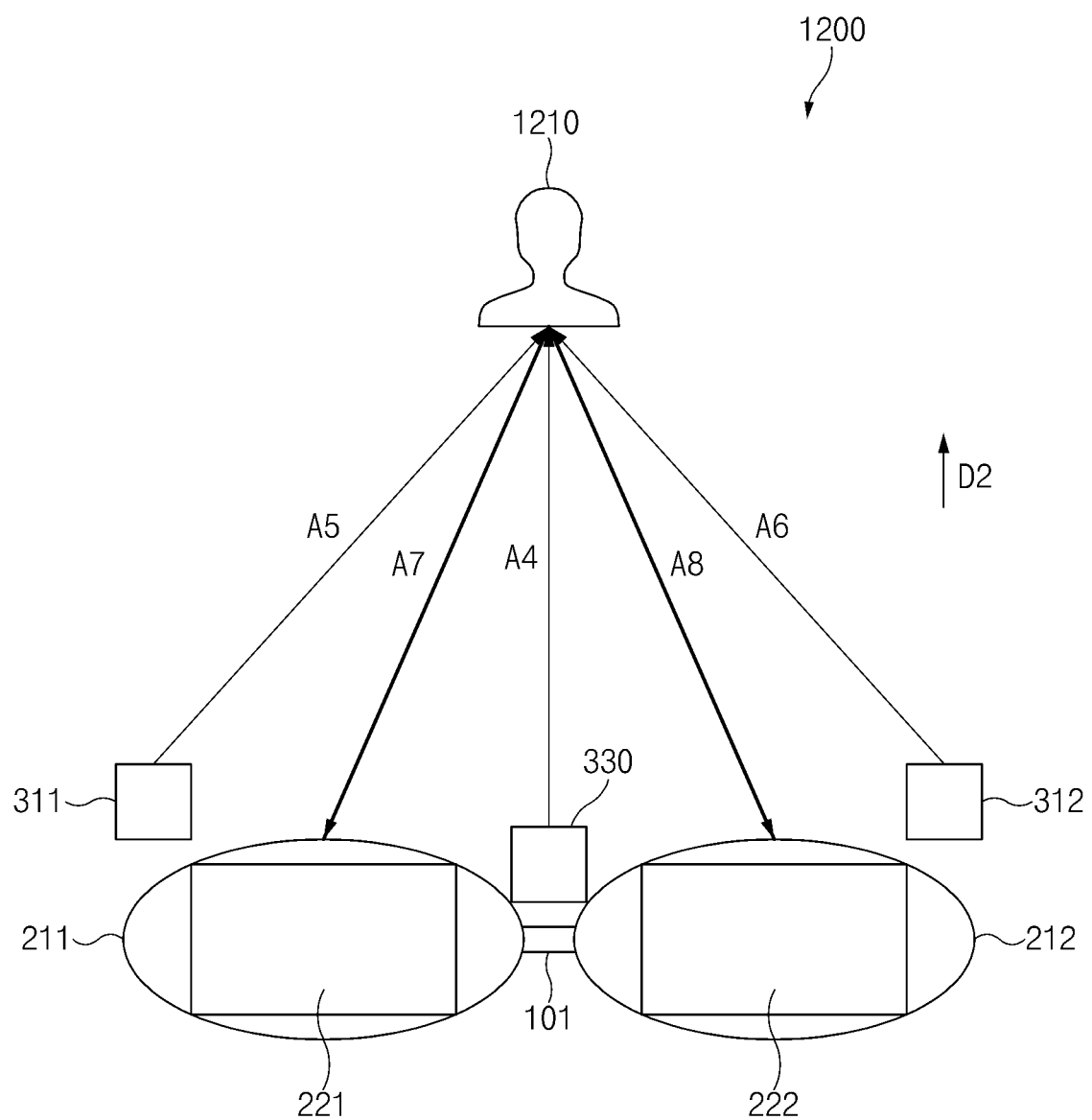
FIG. 12 is a drawing illustrating a method for calculating a distance between a wearable electronic device and a user and a position of a user according to an embodiment of the disclosure.

FIG. 12 is a drawing 1200 illustrating a method for calculating a distance between a wearable electronic device 101 and a user 1210 and a position of a user according to an embodiment of the disclosure.

Referring to FIG. 12, the user 1210 may be located in a second direction D2 which is an outer direction of the wearable electronic device 101. A processor (e.g., a processor 120 of FIG. 1) of the wearable electronic device 101 may calculate a distance between the wearable electronic device 101 and the user 1210 using first cameras 311 and 312 and a third camera 330. The processor 120 may calculate a position of the user 1210 located in the second direction D2 using the first cameras 311 and 312 and the third camera 330.

In an embodiment of the disclosure, the processor 120 may measure a fourth distance A4 which is a distance of the user 1210 in the second direction D2 from the wearable electronic device 101 using the third camera 330. The processor 120 may measure a fifth distance A5 and a sixth distance A6 which are distances of the user 1210 from both ends of the wearable electronic device 101 using the first cameras 311 and 312. The processor 120 may calculate a seventh distance A7 and an eighth distance A8, which are distances where the user 1210 sees display areas 221 and 222 of glasses 211 and 212, using the measured fourth distance A4, fifth distance A5, and sixth distance A6. The processor 120 may identify a distance between the wearable electronic device 101 and the user 1210 using a depth camera and a gesture camera.

In an embodiment of the disclosure, the processor 120 may calculate angles where the user 1210 sees the display areas 221 and 222 of the glasses 211 and 212, using the measured fourth distance A4, fifth distance A5, and sixth distance A6. The processor 120 may calculate a position of the user 1210 based on the angles where the user 1210 sees the display areas 221 and 222 of the glasses 211 and 212. The position of the user 1210 may include information about whether the face of the user 1210 is located at any of an upper portion, a lower portion, a left side, or a right side with respect to the wearable electronic device 101. The processor 120 may identify whether the user 1210 gazes at the screens displayed on the display areas 221 and 222 of the glasses 211 and 212 in any direction based on the calculated position of the user 1210.

Figure 13:
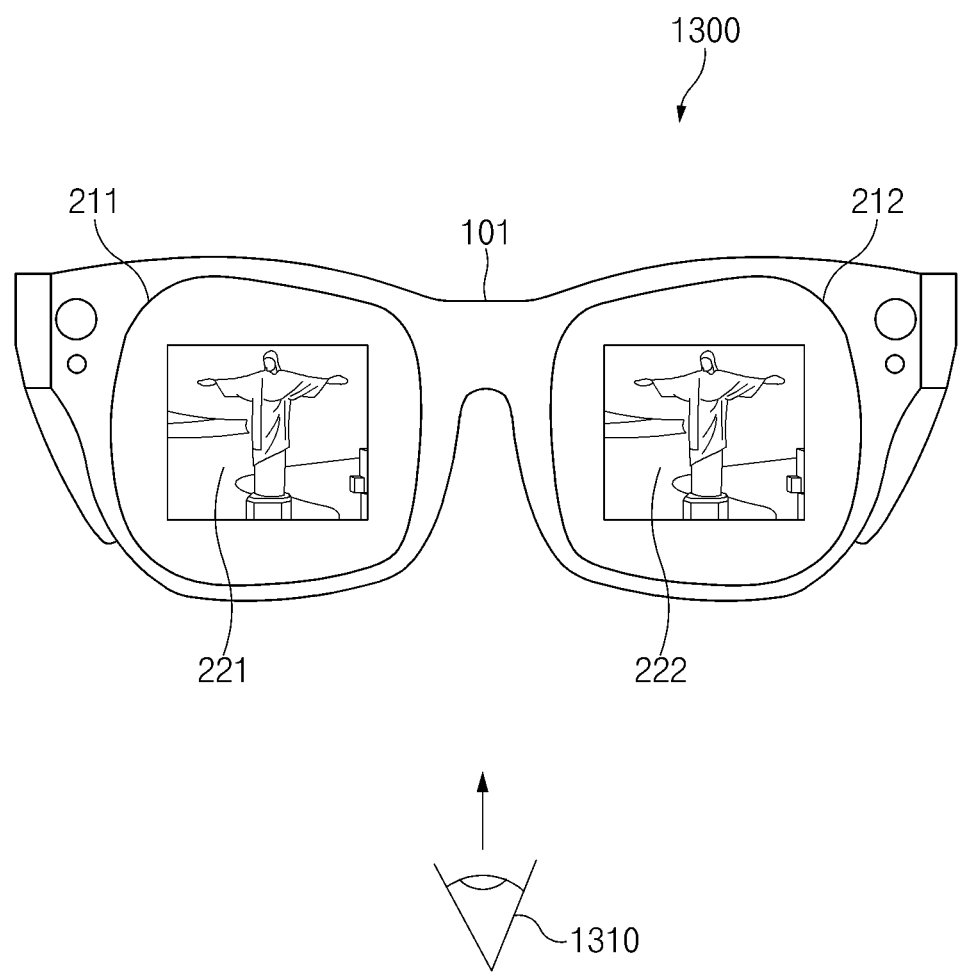
FIG. 13 is a drawing illustrating screens displayed on display areas by a display of a wearable electronic device according to an embodiment of the disclosure.

FIG. 13 is a drawing 1300 illustrating screens displayed on display areas 221 and 222 by a display (e.g., a display module 160 of FIG. 3) of a wearable electronic device 101 according to an embodiment of the disclosure.

Referring to FIG. 13, a processor 120 may change output areas of the screens depending on a calculated distance between the wearable electronic device 101 and a user 1310. The processor 120 may compare sizes of display areas 221 and 222 based on the distance between the wearable electronic device 101 and the user 1310 as shown in Table 1 to change sizes of the output areas of the screens.

TABLE 1

| Distance between wearable electronic device 101 and user 1310 | Sizes of output areas of screens compared with sizes of display areas 221 and 222 |
| --- | --- |
| 20 cm | 90% |
| 40 cm | 80% |
| 60 cm | 70% |
| 80 cm | 60% |

In an embodiment of the disclosure, the processor 120 may be configured to display the screens based on the changed output areas. The processor 120 may calculate a change in sizes of eye box areas capable of showing the screens depending on the distance of the user 1310. The processor 120 may change the output areas of the screens to correspond to the changed eye box areas. As the distance between the wearable electronic device 101 and the user 1310 increases, when the eye box areas are reduced and when the screens are zoomed in to be seen, the processor 120 may change the output areas of the screens to be substantially the same as the eye box areas. The processor 120 may prevent the user 1310 from seeing screens cut at edges of the display areas 221 and 222. The processor 120 may change the output areas of the screens such that the user 1310 identifies intact screens.

In an embodiment of the disclosure, the processor 120 may be configured to adjust a size of content displayed on the screens depending on the distance between the wearable electronic device 101 and the user 1310. As the distance between the wearable electronic device 101 and the user 1310 increases, the processor 120 may reduce the size of the content displayed on the screens to correspond to a phenomenon in which the eye box areas of the user are reduced and when the screens are zoomed in to be seen. Thus, the processor 120 could reduce a phenomenon in which content is cut at edges of the display areas 221 and 222 as the screens are zoomed in to be seen, such that the user 1310 may easily identify the content displayed on the screens.

In an embodiment of the disclosure, the processor 120 may change brightnesses of the screens depending on the distance between the wearable electronic device 101 and a user 1310. The processor 120 may change brightnesses of the screens compared with brightnesses of the screens when the user 1310 is wearing the wearable electronic device 101 based on the distance between the wearable electronic device 101 and the user 1310.

TABLE 2

| Distance between wearable electronic device 101 and user | Brightnesses of screens compared with brightnesses of screens when user 1310 is wearing wearable electronic device 101 |
|---|---|
| 20 cm | 110% |
| 40 cm | 120% |
| 60 cm | 130% |
| 80 cm | 140% |

In an embodiment of the disclosure, the processor 120 may be configured to display the screens based on the changed brightnesses. When the distance between the wearable electronic device 101 and the user 1310 increases, brightnesses of the screens shown to the user 1310 may decrease. The processor 120 may increase the brightnesses of the screens with regard to a decrease in brightness detected by the user 1310. Thus, the processor 120 could reduce a phenomenon in which the brightness of the screens the user 1310 sees reduce. The processor 120 may adjust the brightnesses of the screens such that the user 1310 identifies intact screens.

In an embodiment of the disclosure, the processor 120 may change output areas of the screens based on the calculated position of the user 1310. The processor 120 may change the output areas of the screens such that the screens are viewed in the center without leaning when viewing the screens at the calculated position of the user 1310.

In an embodiment of the disclosure, the processor 120 may change brightnesses of the screens based on the calculated position of the user 1310. The more distant the calculated position of the user 1310 departs from the front of a second direction (e.g., a second direction D2 of FIG. 2) of the wearable electronic device 101, the brighter the processor 120 may make the screens. The processor 120 may adjust the brightnesses of the screens such that it is easy for the user 1310 to identify the screens at a tilted angle.

Figure 14:
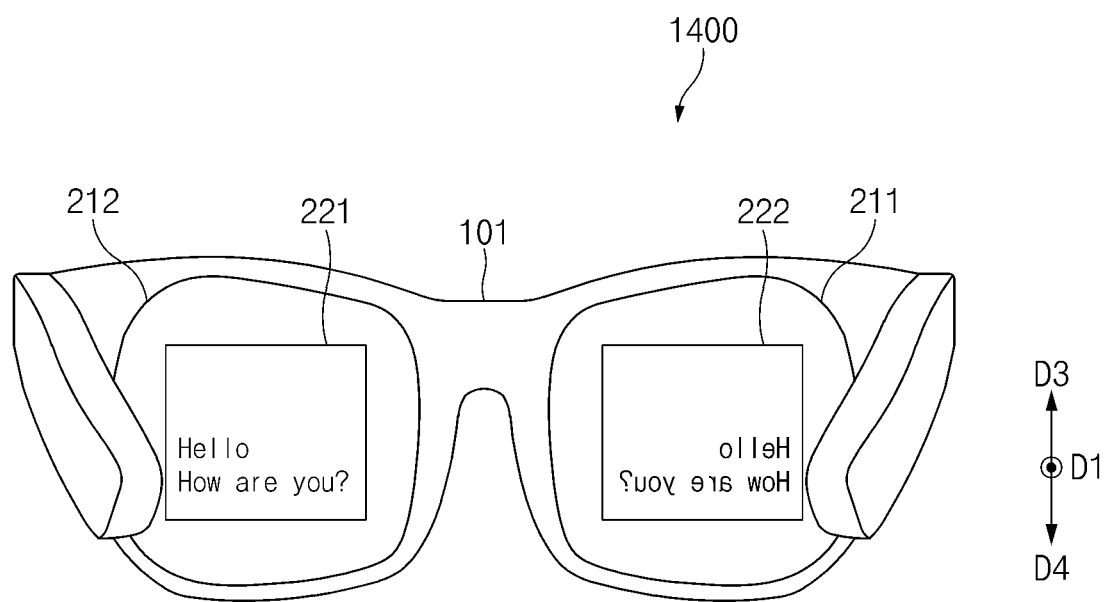
FIG. 14 is a drawing illustrating screens displayed on display areas by a wearable electronic device, when a user is not wearing a wearable electronic device, according to an embodiment of the disclosure.

FIG. 14 is a drawing 1400 illustrating screens displayed on display areas 221 and 222 by a wearable electronic device 101, when a user is not wearing a wearable electronic device 101, according to an embodiment of the disclosure.

In an embodiment of the disclosure, a processor (e.g., the processor 120 of FIG. 3) of the wearable electronic device 101 may detect that the user is not wearing the wearable electronic device 101 using a first sensor (e.g., a first sensor 341 of FIG. 3).

Referring to FIG. 14, when the user is not wearing the wearable electronic device 101, the processor 120 may control a display (e.g., a display module 160 of FIG. 3) to output screens including a message (e.g., Hello. How are you?) identifying where the user is.

In an embodiment of the disclosure, when the position of the user is not identified, the processor 120 may respectively output screens in a first direction D1 which is an inner direction and a second direction (e.g., a second direction D2 of FIG. 2) which is an outer direction. The processor 120 may output a screen of a first display area 221 between display areas 221 and 222 in the first direction D1 and may output a screen of the second display area 222 in the second direction D2. Thus, the user may identify the screens in a direction where the user is currently located between the first direction D1 or the second direction D2. For example, the screens displayed on the first display area 221 and the second display area 222 of FIG. 14 may correspond to an operation of respectively displaying the screens in the inner direction (e.g., the first direction D1 of FIG. 2) and the outer direction (e.g., the second direction D2 of FIG. 2) in operation 710 of FIG. 7.

Figure 15:
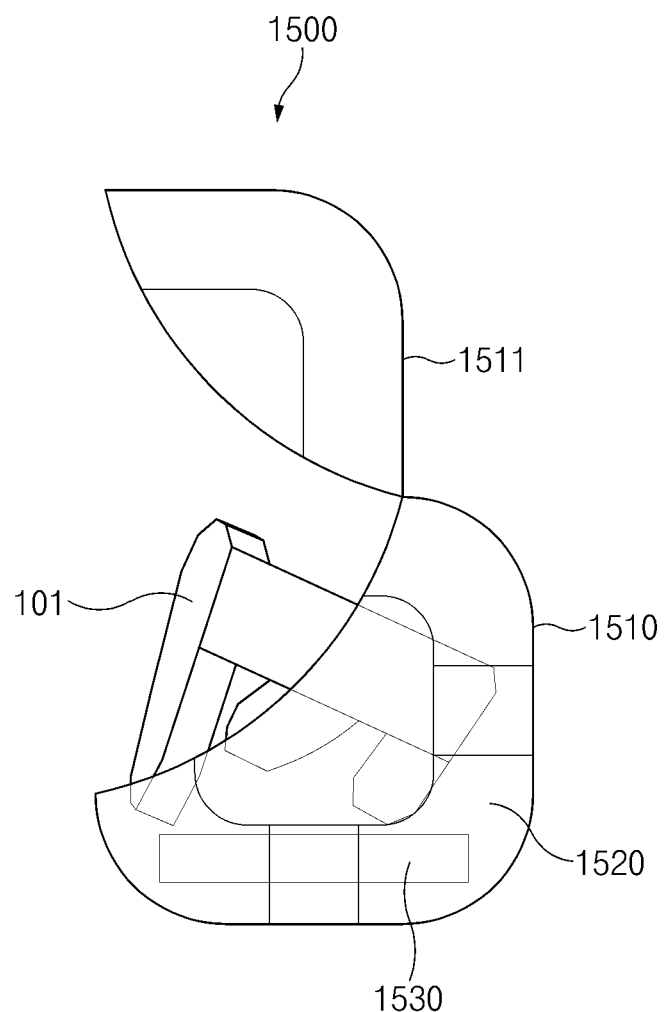
FIG. 15 is a drawing illustrating a system including a wearable electronic device and a case according to an embodiment of the disclosure.
Figure 15:
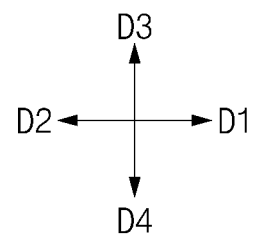

FIG. 15 is a drawing illustrating a system 1500 including a wearable electronic device 101 and a case 1510 according to an embodiment of the disclosure.

Referring to FIG. 15, the wearable electronic device 101 may be received in the case 1510. When the user is not wearing the wearable electronic device 101, the wearable electronic device 101 may be received in the case 1510. The case 1510 may include a cover 1511, a receiving part 1520, and charging circuitry 1530.

In an embodiment of the disclosure, when the wearable electronic device 101 is received in the case 1510, it may identify that the wearable electronic device 101 is received in the case 1510 via a charging terminal (not shown) or communication circuitry (e.g., communication circuitry 370 of FIG. 3). When received in the case 1510, the wearable electronic device 101 may determine whether a user is located within a specified distance by means of a camera module (e.g., a camera module 180 of FIG. 3). For example, the specified distance may be an area where the user may identify screens displayed on display areas 221 and 222 by a display module 160, which may be set by the user.

In an embodiment of the disclosure, the cover 1511 may be formed on one surface of the case 1510. The cover 1511 may have a lid structure capable of being opened and closed. The cover 1511 may protect the received wearable electronic device 101 from external foreign substances and/or an external impact. When the cover 1511 of the case 1510 is opened, the user may identify screens displayed by the wearable electronic device 101 in a state where the wearable electronic device 101 is received in the case 1510. For example, the user may identify the screens displayed by the wearable electronic device 101 while charging the wearable electronic device 101 by means of the case 1510.

In an embodiment of the disclosure, the receiving part 1520 may receive the wearable electronic device 101. The receiving part 1520 may include a space capable of keeping the wearable electronic device 101 and a support member.

In an embodiment of the disclosure, the charging circuitry 1530 may charge the wearable electronic device 101 received in the receiving part 1520. The charging circuitry 1530 may be disposed on a lower portion of the receiving part 1520. For example, the charging circuitry 1530 may supply power to a battery (e.g., a battery 189 of FIG. 1) of the wearable electronic device 101 via an interface (e.g., an interface 177 of FIG. 1) included in the wearable electronic device 101 or may wirelessly supply power to the wearable electronic device 101 through a wireless charging coil (not shown).

Figure 16:
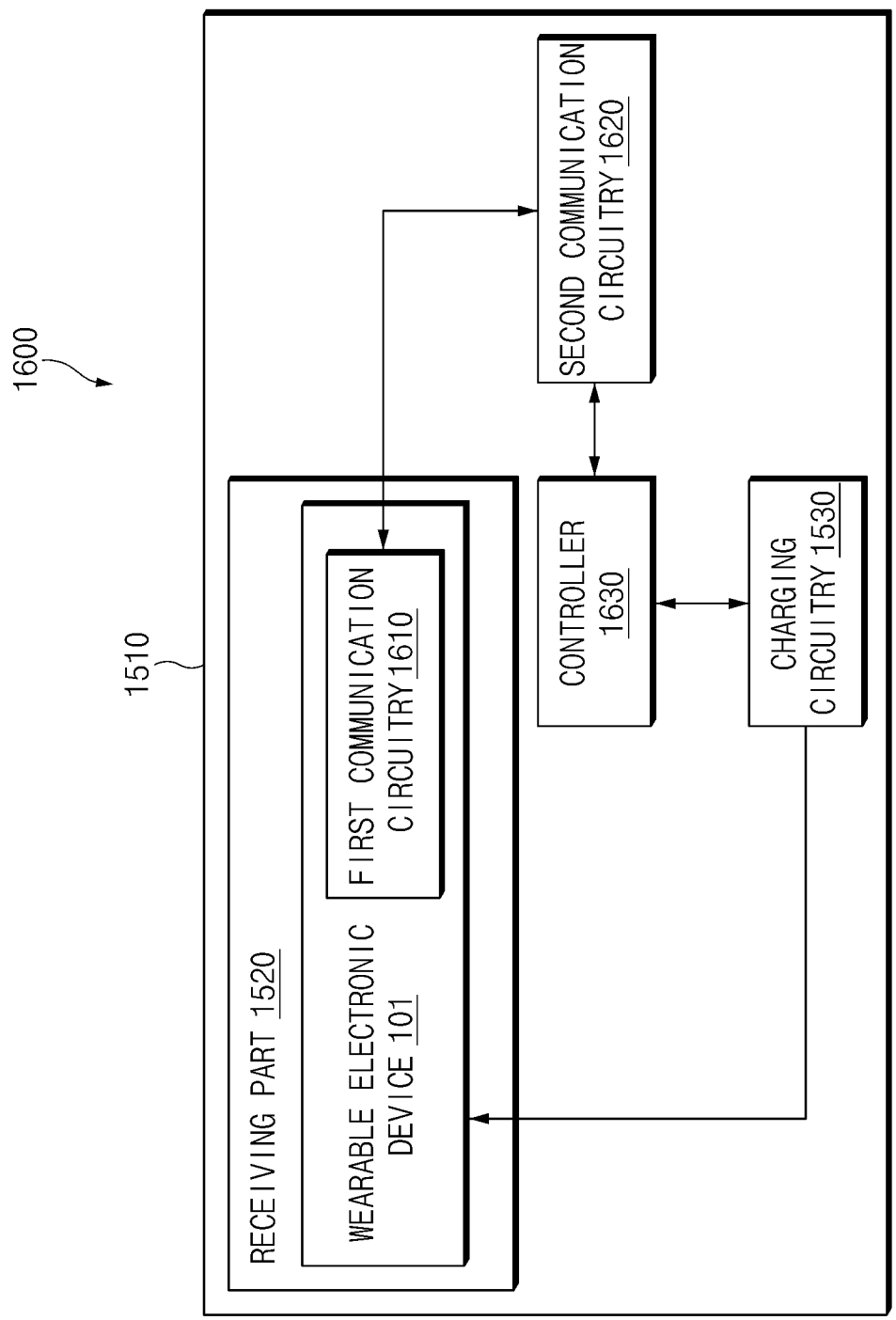
FIG. 16 is a block diagram illustrating a system including a wearable electronic device and a case according to an embodiment of the disclosure.

FIG. 16 is a drawing 1600 illustrating a system 1500 including a wearable electronic device 101 and a case 1510 according to an embodiment of the disclosure.

Referring to FIG. 16, the wearable electronic device 101 may include first communication circuitry 1610 (e.g., communication circuitry 370 of FIG. 3). The wearable electronic device 101 may be received in a receiving part 1520 of the case 1510. The wearable electronic device 101 may be charged by charging circuitry 1530 of the case 1510.

In an embodiment of the disclosure, the case 1510 may include second communication circuitry 1620. The second device 1620 may transmit and receive various signals and data with the first communication circuitry 1610. For example, the second communication circuitry 1620 may receive information associated with screens displayed by the wearable electronic device 101 from the first communication circuitry 1610. For another example, the second communication circuitry 1620 may transmit information associated with charging (e.g., battery remaining capacity of the case 1510 and/or whether the case 1510 is being charged by means of an external power source) to the first communication circuitry 1610.

In an embodiment of the disclosure, the case 1510 may include a controller 1630. The controller 1630 may control operations of the charging circuitry 1530 and the second communication circuitry 1620. For example, the controller 1630 may identify that the wearable electronic device 101 is located in the receiving part 1520 of the case 1510 by means of the charging circuitry 1530. When the wearable electronic device 101 is located in the receiving part 1520, the controller 1630 may enable the second communication circuitry 1620 and may control the second communication circuitry 1620 to receive information associated with the displayed screens from the wearable electronic device 101.

Figure 17:
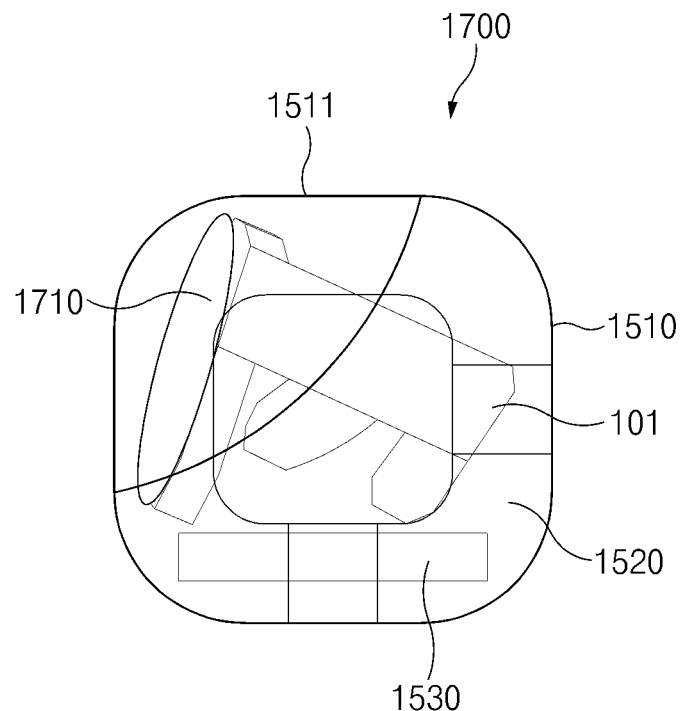
FIG. 17 is a drawing illustrating a case in which a wearable electronic device is received according to an embodiment of the disclosure.
Figure 17:
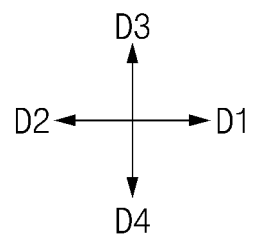

FIG. 17 is a drawing 1700 illustrating a case 1510 in which a wearable electronic device 101 is received according to an embodiment of the disclosure.

Referring to FIG. 17, the case 1510 may include a lens module 1710. The lens module 1710 may be disposed on at least partial surface of the case 1510. When the wearable electronic device 101 is received in the receiving part 1520, the lens module 1710 may show screens displayed on display areas (e.g., display areas 221 and 222 of FIG. 3) by a display (e.g., a display module 160 of FIG. 3).

In an embodiment of the disclosure, when the wearable electronic device 101 is located in the case 1510 and the cover 1511 is closed, the case 1510 may hide the wearable electronic device 101. When the lens module 1710 is disposed on at least a partial surface of the case 1510, the user could identify screens displayed on the display areas 221 and 222 by the display module 160 even when the wearable electronic device 101 is located in the case 1510 and the case 1510 is closed.

In an embodiment of the disclosure, the lens module 1710 may be disposed on at least partial surface of the cover 1511. The cover 1511 may be opened and closed. When the cover 1511 is opened, the user could identify screens displayed on the display areas 221 and 222 directly. When the cover 1511 is closed, the user could identify the screens displayed on the display areas 221 and 222 through the lens module 1710.

In an embodiment of the disclosure, the case 1510 may include a sensor (e.g., a hall sensor) (not shown) capable of sensing that the cover 1511 is opened and closed. In an embodiment of the disclosure, when the wearable electronic device 101 is located in the receiving part 1520 of the case 1510 and the cover 1511 is closed, the case 1510 may request and receive information associated with the displayed screens from the wearable electronic device 101 via communication circuitry (e.g., second communication circuitry 1620 of FIG. 16). The case 1510 may display screens based on information received from the wearable electronic device 101 by means of the lens module 1710. In another embodiment of the disclosure, when the wearable electronic device 101 is located in the receiving part 1520 of the case 1510 and the cover 1511 is opened, the case 1510 may request the wearable electronic device 101 to display the screens, via the communication circuitry (e.g., the second communication circuitry 1620 of FIG. 16). The wearable electronic device 101 may display the screens on the display module 160 based on the screen display request from the case 1510.

Figure 18:
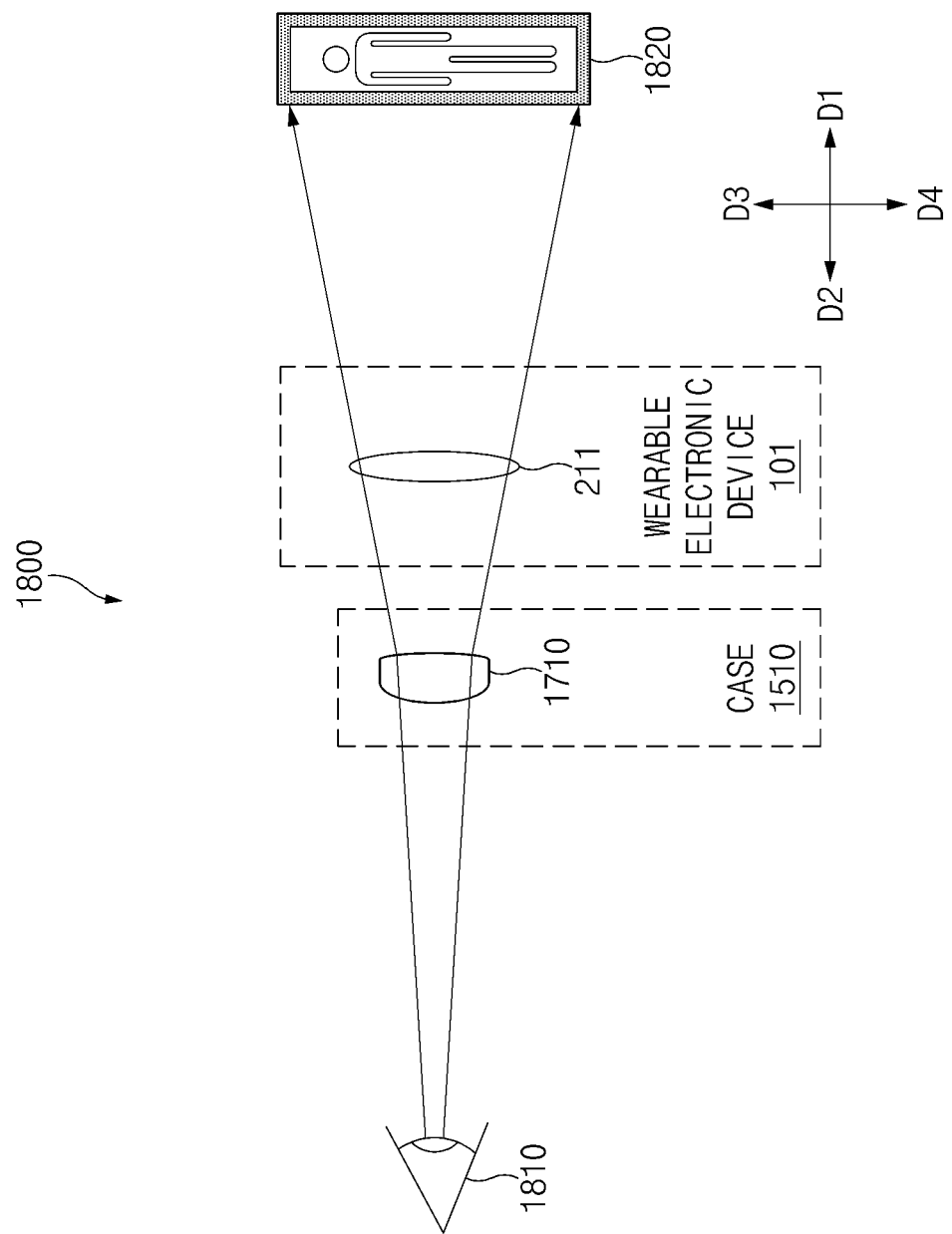
FIG. 18 is a drawing illustrating identifying screens displayed on display areas by a display of a wearable electronic device in a state where a wearable electronic device is received in a case according to an embodiment of the disclosure.

FIG. 18 is a drawing 1800 illustrating identifying screens displayed on display areas (e.g., display areas 221 and 222) by a display (e.g., a display module 160 of FIG. 3) of a wearable electronic device 101 in a state where a wearable electronic device 101 is received in a case 1510 according to an embodiment of the disclosure.

Referring to FIG. 18, the display module 160 of the wearable electronic device 101 may display a screen on the display area 221 of a first glass 211 of the wearable electronic device 101. A user 1810 may see the first glass 211 of the wearable electronic device 101 by means of a lens module 1710 of the case 1510. A screen may be located on a virtual image position 1820 by a line of sight of the user 1810.

In an embodiment of the disclosure, the lens module 1710 may increase a size of an eye box area when seeing it in a second direction D2 which is an outer direction. The lens module 1710 may zoom in on a screen displayed at the virtual image position 1820. When the lens module 1710 has a fixed magnification, it may enlarge the physical size of the screen displayed at the virtual image position 1820. The lens module 1710 may be including a convex lens capable of zooming in on screens displayed on the display areas 221 and 222.

In an embodiment of the disclosure, the lens module 1710 may change an angle of refraction which is toward the virtual image position 1820 from the user 1810 to identify a screen formed in an eye box area at a long distance. By zooming in the screen displayed on the display area 221, the lens module 1710 could reduce a phenomenon in which at least a portion of the screen is not seen. Thus, the user could easily identify the screen from the outside of the case 1510 by the lens module 1710.

In an embodiment of the disclosure, a refractive index of the lens module 1710 may be set according to a size of the screen located at the virtual image position 1820. The lens module 1710 may be including a member, a refractive index of which may be changed. For example, the lens module 1710 may be including a member, a refractive index of which may be changed, for example, a liquid lens, to adjust eye box areas. Thus, the lens module 1710 could reduce a phenomenon in which the screen displayed on the display area 221 is not seen.

In an embodiment of the disclosure, a refractive index of the lens module 1710 may be set according to a position of the user. Information associated with the position of the user may be obtained by cameras (e.g., cameras 2121 and 2122 of FIG. 21) provided in the case 1510.

Figure 19:
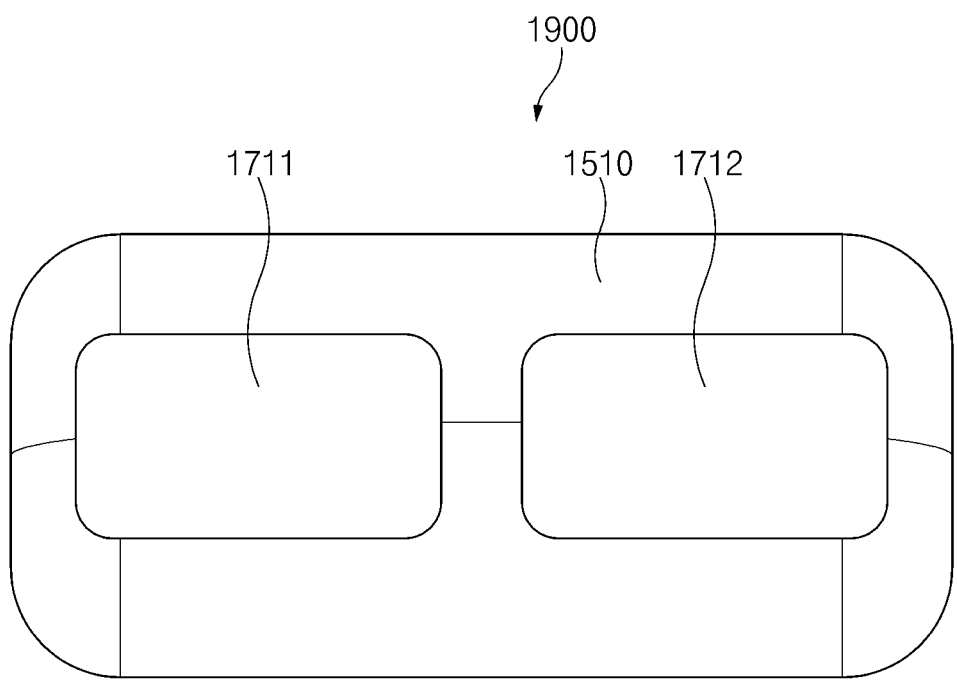
FIG. 19 is a drawing illustrating lens modules of a case and a wearable electronic device according to an embodiment of the disclosure.
Figure 19:
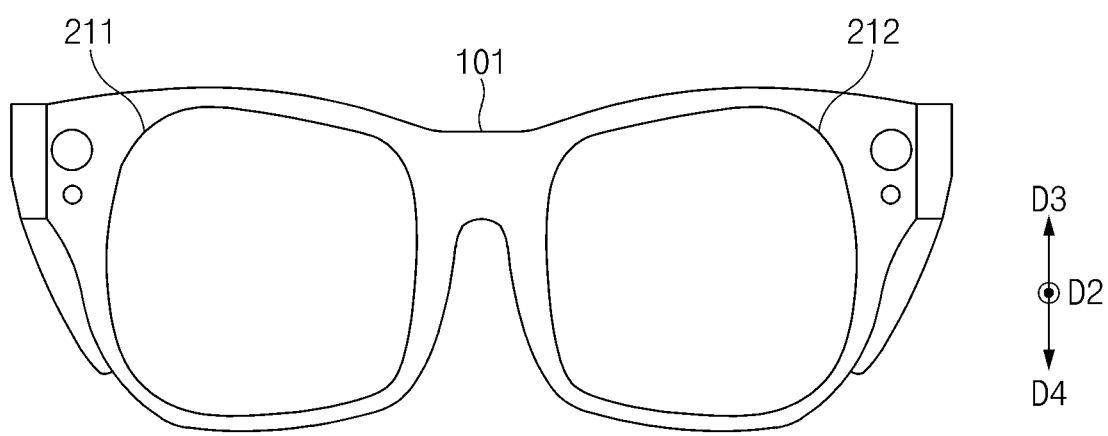

FIG. 19 is a drawing illustrating lens modules 1711 and 1712 (e.g., a lens module 1710 of FIG. 17 and/or FIG. 18) of a case 1510 and a wearable electronic device 101 according to an embodiment of the disclosure.

Referring to FIG. 19, when the wearable electronic device 101 is received in a receiving part 1520, the lens modules 1711 and 1712 may be arranged at positions corresponding to display areas (e.g., display areas 221 and 222 of FIG. 3). The lens module 1710 may be disposed at a position corresponding to positions of screens displayed on display areas 221 and 222 by a display (e.g., a display module 160 of FIG. 3). For example, when the wearable electronic device 101 is received in the receiving part 1520, the lens module 1710 may be located substantially parallel to and overlapped with the display areas (e.g., the display areas 221 and 222 of FIG. 3).

Figure 20:
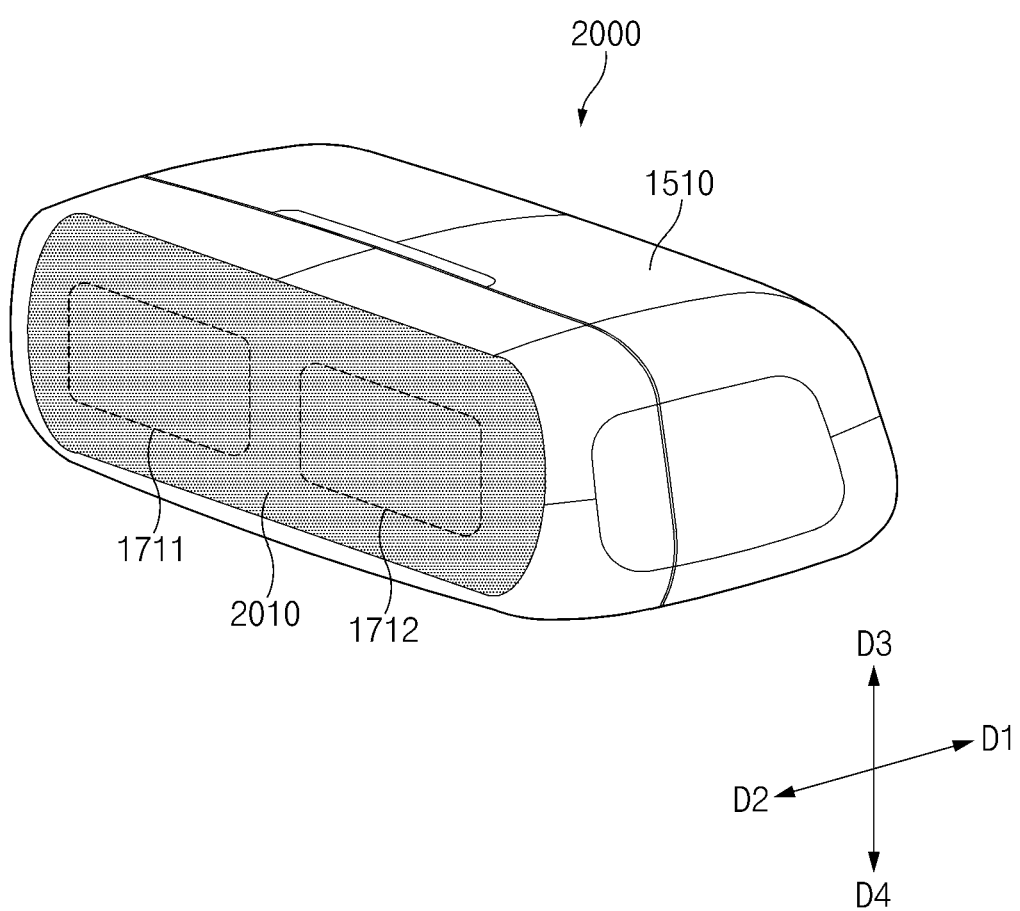
FIG. 20 is a drawing illustrating a case including lens modules according to an embodiment of the disclosure.

FIG. 20 is a drawing 2000 illustrating a case 1510 including lens modules 1711 and 1712 (e.g., a lens module 1710 of FIG. 17 and/or FIG. 18) according to an embodiment of the disclosure.

Figure 21:
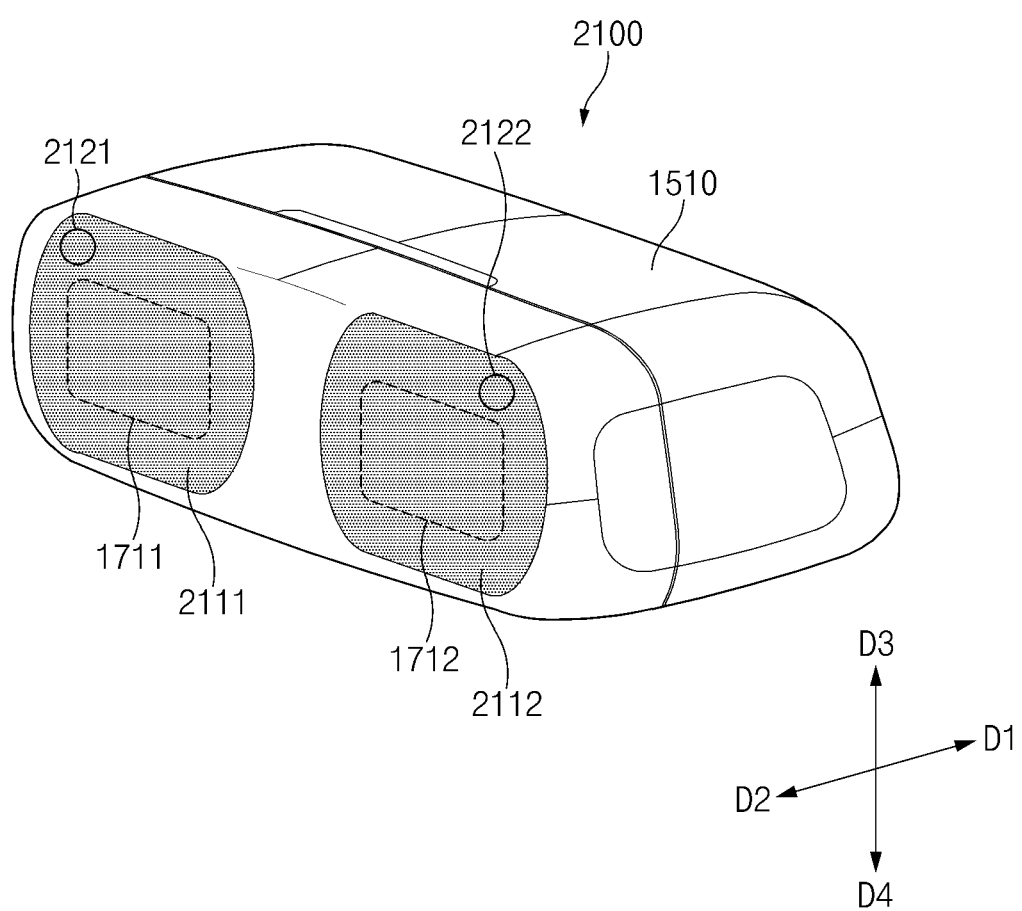
FIG. 21 is a drawing illustrating a case including lens modules and cameras according to an embodiment of the disclosure.

Referring to FIG. 20, the case 1510 may further include a shielding member 2010 for selectively covering or opening the lens module 1710. For example, the lens modules 1711 and 1712 may be plural (e.g., 2) in number to correspond to glasses (e.g., glasses 211 and 212 of FIG. 2) of the wearable electronic device (e.g., the wearable electronic device 101 of FIG. 2). The shielding member 2010 may be an opaque member disposed on an inner surface of the lens modules 1711 and 1712. For example, the shielding member 2010 may be including one shielding member to include the lens modules 1711 and 1712 as shown in FIG. 20 or may be including a plurality of shielding members to correspond respectively to the lens modules 1711 and 1712 as shown in FIG. 21. The shielding member 2010 may automatically and/or manually hide inner surfaces of the lens modules 1711 and 1712. When hiding the inner surface of the lens module 1710, the shielding member 2010 may hide screens displayed by the wearable electronic device (e.g., the wearable electronic device 101 of FIG. 2). The shielding member 2010 may be automatically and/or manually folded to be spaced apart from the inner surfaces of the lens modules 1711 and 1712 and be located on an inner surface of the case 1510 except for a surface where the lens modules 1711 and 1712 are arranged. When the shielding member 2010 is folded to be located on the inner surface of the case 1510 except for the surface where the lens modules 1711 and 1712 are arranged, a user may identify screens displayed by the wearable electronic device (e.g., the wearable electronic device 101 of FIG. 2) by means of the lens modules 1711 and 1712.

In an embodiment of the disclosure, second communication circuitry (e.g., second communication circuitry 1620 of FIG. 16) may receive an activation signal, while a display (e.g., a display module 160 of FIG. 3) displays screens on the display areas 221 and 222, from first communication circuitry (e.g., first communication circuitry 1610 of FIG. 16). When the second communication circuitry 1620 receives the activation signal, a controller (e.g., a controller 1630 of FIG. 16) of the case 1510 may determine that the display module 160 displays the screens on the display areas 221 and 222.

In an embodiment of the disclosure, the shielding member 2010 may selectively cover or open the lens modules 1711 and 1712 based on the activation signal. When the second communication circuitry 1620 receives the activation signal, the controller 1630 may control the shielding member 2010 to open the lens modules 1711 and 1712. When the second communication circuitry 1620 does not receive the activation signal, the controller 1630 may control the shielding member 2010 to cover the lens modules 1711 and 1712. When the shielding member 2010 opens the lens modules 1711 and 1712 while receiving the activation signal, the user could identify the screens displayed on the display areas 221 and 222 by the lens modules 1711 and 1712. When the shielding member 2010 covers the lens modules 1711 and 1712 while receiving the activation signal, the wearable electronic device (e.g., the wearable electronic device 101 of FIG. 19) which is in an inactive state may be kept in a state where it is not seen from the outside of the case 1510.

FIG. 21 is a drawing 2100 illustrating a case 1510 including lens modules 1711 and 1712 and cameras 2121 and 2122 according to an embodiment of the disclosure.

Referring to FIG. 21, the case 1510 may further include the shielding members 2111 and 2112 and the cameras 2121 and 2122. The cameras 2121 and 2122 may be arranged on an outer surface of the case 1510. The cameras 2121 and 2122 may be arranged to face a second direction D2. The cameras 2121 and 2122 may detect a distance of an object disposed in the second direction D2. For example, when a user is in the second direction D2, the cameras 2121 and 2122 may detect a distance between the case 1510 and the user.

In an embodiment of the disclosure, the cameras 2121 and 2122 may deliver information associated with the distance between the case 1510 and the user to a controller (e.g., a controller 1630 of FIG. 16) of the case 1510. The controller 1630 may deliver the information associated with the distance between the case 1510 and the user to a wearable electronic device (e.g., a wearable electronic device 101 of FIG. 2) using second communication circuitry (e.g., second communication circuitry 1620 of FIG. 16).

In an embodiment of the disclosure, the wearable electronic device 101 may control a size of content of screens displayed on display areas (e.g., display areas 221 and 222 of FIG. 2) using the information associated with the distance between the case 1510 and the user. A processor (e.g., a processor 120 of FIG. 1) of the wearable electronic device 101 may reduce a size of content of the screens displayed on the display areas 221 and 222 to prevent a phenomenon where the user does not see at least a portion of the screens because eye box areas are reduced when the case 1510 and the user are away from each other. The screens displayed on the display areas 221 and 222 may be zoomed in by the lens modules 1711 and 1712 of the case 1510. The processor 120 may set a size of content of the screens with regard to a ratio where the content of the screens displayed on the display areas 221 and 222 is zoomed in by the lens modules 1711 and 1712.

A wearable electronic device (e.g., a wearable electronic device 101 of FIG. 2) according to various embodiments may include a housing (e.g., a housing 200 of FIG. 2) including a first housing portion (e.g., a first housing portion 210 of FIG. 2), a second housing portion (e.g., a second housing portion 220 of FIG. 2), and a third housing portion (e.g., a third housing portion 230 of FIG. 2), glasses (e.g., glasses 211 and 212 of FIG. 2) surrounded by the second housing portion 220, a display (e.g., a display module 160 of FIG. 2) for displaying screens in an inner direction (e.g., a first direction D1 of FIG. 2) and an outer direction (e.g., a second direction D2 of FIG. 2) on display areas (e.g., display areas 221 and 222 of FIG. 2) of the glasses 211 and 212, a sensor module (e.g., a sensor module 176 of FIG. 3) including a first sensor (e.g., a first sensor 341 of FIG. 3) for identifying whether a user is wearing the wearable electronic device 101, a second sensor (e.g., a second sensor 342 of FIG. 3) for determining a direction where the wearable electronic device 101 is placed, and a third sensor (e.g., a third sensor 343 of FIG. 3) for determining whether the first housing portion 210 and/or the third housing portion 230 are/is folded, a camera module (e.g., a camera module 180 of FIG. 3) including first cameras (e.g., first cameras 311 and 312 of FIG. 3) for tracking a hand gesture of the user and recognizing a space, second cameras (e.g., second cameras 321 and 322 of FIG. 3) for tracking pupils of the user, and a third camera (e.g., a third camera 330 of FIG. 3) for capturing the outside, and a processor (e.g., a processor 120 of FIG. 3) connected with the display module 160, the sensor module 176, and the camera module 180. The processor 120 may be configured to control the screens displayed on the display areas 221 and 222 by the display module 160 based on whether the wearable electronic device 101 is worn, the direction where the wearable electronic device 101 is placed, whether the first housing portion 210 and/or the third housing portion 230 are/is folded, and a position of the user.

In an embodiment of the disclosure, the processor 120 may be configured to control the display module 160 to display the screens on the display areas 221 and 222 based on a first direction D1 which is an inner direction D1 of the wearable electronic device 101, when the user is wearing the wearable electronic device 101, and display the screens on the display areas 221 and 222 based on a second direction D2 which is an outer direction D2 of the wearable electronic device 101, when the user is not wearing the wearable electronic device 101.

In an embodiment of the disclosure, the processor 120 may be configured to control the display module 160 to reverse and display the screens when displaying the screens on the display areas 221 and 222 based on the second direction D2.

In an embodiment of the disclosure, the processor 120 may be configured to determine the direction where the wearable electronic device 101 is placed with respect to the ground parallel to a landscape orientation and control the display module 160 to invert and display the screens, when the wearable electronic device 101 is in an inverted second state as compared with a first state which is a state where the wearable electronic device 101 is placed in the same direction as a state where the user is wearing the wearable electronic device 101.

In an embodiment of the disclosure, the processor 120 may be configured to calculate a distance between the wearable electronic device 101 and the user, change output areas and/or brightnesses of the screens based on the calculated distance, and control the display module 160 to display the screens based on the changed output areas and/or brightnesses.

In an embodiment of the disclosure, the processor 120 may be configured to calculate eye box areas of the screens corresponding to the calculated distance and view dead areas except for the eye box areas and control the display module 160 to change the output areas to the eye box areas.

In an embodiment of the disclosure, the processor 120 may be configured to adjust a size of content displayed on the screens depending on the calculated distance.

In an embodiment of the disclosure, the glasses 211 and 212 may include a first glass (e.g., a first glass 211 of FIG. 2) and a second glass (e.g., a second glass 212), and the processor 120 may be configured to control the display module 160 to display a first screen displayed on the first glass 211 between the screens based on the first direction D1, when the position of the user is not identified, and display a second display displayed on the second glass 212 between the screens based on the second direction D2.

A method for controlling screens displayed on display areas 221 and 222 by a display module 160 of a wearable electronic device 101 according to various embodiments may include identifying (operation 610 of FIG. 6) whether a user is wearing the wearable electronic device 101 using a first sensor 341, determining (operation 620 of FIG. 6) a direction where the wearable electronic device 101 is placed using a second sensor 342, when the user is not wearing the wearable electronic device 101, determining (operation 630 of FIG. 6) whether a first housing portion 210 and/or a third housing portion 230 of the wearable electronic device 101 are/is folded using a third sensor 343, determining (e.g., operation 640 of FIG. 6) a position of the user using first cameras 311 and 312 and second cameras 321 and 322, and controlling (e.g., operation 650 of FIG. 6) the screens displayed on the display areas 221 and 222 by the display module 160 based on whether the wearable electronic device 101 is worn, the direction where the wearable electronic device 101 is placed, whether the first housing portion 210 and/or the third housing portion 230 are/is folded, and the position of the user.

In an embodiment of the disclosure, the controlling (operation 650) of the screens displayed on the display areas 221 and 222 by the display module 160 may include displaying (e.g., operation 703 of FIG. 7), by the display module 160, the screens based on a first direction D1 which is an inner direction D1 of the wearable electronic device 101, when the user is wearing the wearable electronic device 101, and displaying (operation 708 of FIG. 7) the screens based on a second direction D2 which is an outer direction of the wearable electronic device 101, when the user is not wearing the wearable electronic device 101.

In an embodiment of the disclosure, the determining (operation 640) of the position of the user may include calculating a distance between the wearable electronic device 101 and the user while identifying the position of the user and changing (e.g., operation 707 of FIG. 7) output areas and/or brightnesses of the screens based on the calculated distance.

In an embodiment of the disclosure, the controlling (operation 650) of the screens displayed on the display areas 221 and 222 by the display module 160 may include displaying the screens based on the second direction D2 based on the changed output areas.

In an embodiment of the disclosure, the determining (operation 630) of whether the first housing portion 210 and/or the third housing portion 230 are/is folded may include identifying (e.g., operation 709 of FIG. 7) whether the user is located in the second direction D2 of the wearable electronic device 101, when the first housing portion 210 and the third housing portion 230 are unfolded.

In an embodiment of the disclosure, the identifying (operation 709) of whether the user is located in the second direction D2 of the wearable electronic device 101 may include calculating a distance between the wearable electronic device 101 and the user, when the user is located in the second direction D2 of the wearable electronic device 101, and changing (operation 707) output areas and/or brightnesses of the screens based on the calculated distance.

In an embodiment of the disclosure, the identifying (operation 709) of whether the user is located in the second direction D2 of the wearable electronic device 101 may include displaying (operation 708) the screens based on the second direction D2 based on the changed output areas, when the user is located in the second direction D2 of the wearable electronic device 101 and respectively displaying (e.g., operation 710 of FIG. 7) the screens based on the first direction D1 and the second direction D2, when the user is not located in front of the wearable electronic device 101.

A wearable electronic device 101 of a system (e.g., a system 1500 of FIG. 15) including the wearable electronic device 101 and a case (e.g., a case 1510 of FIG. 15) according to various embodiments may include a housing 200, glasses 211 and 212 including display areas 221 and 222, a display module 160 for displaying screens on the display areas 221 and 222, a camera module 180, first communication circuitry (e.g., first communication circuitry 1610 of FIG. 16), and a processor 120. The case 1510 may include a receiving part (e.g., a receiving part 1520 of FIG. 15) for receiving the wearable electronic device 101, a lens module (e.g., a lens module 1710 of FIG. 17) disposed on at least a partial surface of the case 1510, second communication circuitry (e.g., second communication circuitry 1620 of FIG. 16) for transmitting and receiving a signal with the first communication circuitry 1610, and charging circuitry (e.g., charging circuitry 1530 of FIG. 15) for charging the wearable electronic device 101. The lens module 1710 may show the screens, when the wearable electronic device 101 is received in the receiving part 1520.

In an embodiment of the disclosure, the case 1510 may further include a cover (e.g., a cover 1511 of FIG. 15) capable of being opened and closed. The lens module 1710 may be disposed on at least a portion of the cover 1511.

In an embodiment of the disclosure, the lens module 1710 may be disposed at a position corresponding to the display areas 221 and 222, when the wearable electronic device 101 is received in the receiving part 1520.

In an embodiment of the disclosure, the lens module 1710 may zoom in on screens displayed toward an outer direction D2 of the glasses 211 and 212 on the display module 160.

In an embodiment of the disclosure, the case 1510 may further include a shielding member (e.g., a shielding member 2010 of FIG. 20) for selectively covering or opening the lens module 1710.

In an embodiment of the disclosure, the shielding member 2010 may selectively cover or open the lens module 1710 based on an activation signal received from the first communication circuitry 1610 by the second communication circuitry 1620 while the display module 160 displays the screens.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A wearable electronic device comprising: a housing including a first housing portion, a second housing portion, and a third housing portion; glasses surrounded by the second housing portion; a display configured to display screens in an inner direction and an outer direction on display areas of the glasses; a sensor module including a first sensor configured to identify whether a user is wearing the wearable electronic device, a second sensor configured to determine a direction where the wearable electronic device is placed, and a third sensor configured to determine whether the first housing portion or the third housing portion is folded; a camera module including first cameras configured to track a hand gesture of the user and recognize a space, second cameras configured to track pupils of the user, and a third camera configured to capture the outside; and a processor connected with the display, the sensor module, and the camera module, wherein the processor is configured to: control the screens displayed on the display areas by the display based on whether the wearable electronic device is worn, the direction where the wearable electronic device is placed, whether the first housing portion or the third housing portion is folded, and a position of the user.

2. The wearable electronic device of claim 1, wherein the processor is further configured to: control the display to display the screens on the display areas based on a first direction which is an inner direction of the wearable electronic device, when the user is wearing the wearable electronic device, and display the screens on the display areas based on a second direction which is an outer direction of the wearable electronic device, when the user is not wearing the wearable electronic device.

3. The wearable electronic device of claim 2, wherein the processor is further configured to: control the display to reverse and display the screens when displaying the screens on the display areas based on the second direction.

4. The wearable electronic device of claim 2, wherein the glasses include a first glass and a second glass, and wherein the processor is further configured to: control the display to display a first screen displayed on the first glass between the screens based on the first direction, when the position of the user is not identified, and display a second display displayed on the second glass between the screens based on the second direction.

5. The wearable electronic device of claim 1, wherein the processor is further configured to: calculate a distance between the wearable electronic device and the user, change output areas or brightnesses of the screens based on the calculated distance; and control the display to display the screens based on the changed output areas or brightnesses.

6. The wearable electronic device of claim 5, wherein the processor is further configured to: calculate eye box areas of the screens corresponding to the calculated distance and view dead areas except for the eye box areas, and control the display to change the output areas to the eye box areas.

7. The wearable electronic device of claim 5, wherein the processor is further configured to: adjust a size of content displayed on the screens depending on the calculated distance.

8. A method for controlling screens displayed on display areas by a display of a wearable electronic device, the method comprising: identifying whether a user is wearing the wearable electronic device using a first sensor; determining a direction where the wearable electronic device is placed using a second sensor, when the wearable electronic device is not worn; determining whether a first housing portion or a third housing portion of the wearable electronic device is folded using a third sensor; determining a position of the user using first cameras and second cameras; and controlling the screens displayed on the display areas by the display based on whether the wearable electronic device is worn, the direction where the wearable electronic device is placed, whether the first housing portion or the third housing portion is folded, and the position of the user.

9. The method of claim 8, wherein the controlling of the screens displayed on the display areas by the display includes: displaying, by the display, the screens based on a first direction which is an inner direction of the wearable electronic device, when the user is wearing the wearable electronic device; and displaying the screens based on a second direction which is an outer direction of the wearable electronic device, when the user is not wearing the wearable electronic device.

10. The method of claim 9, wherein the determining of the position of the user includes: calculating a distance between the wearable electronic device and the user while identifying the position of the user; and changing output areas or brightnesses of the screens based on the calculated distance.

11. The method of claim 10, wherein the controlling of the screens displayed on the display areas by the display includes: displaying the screens based on the second direction based on the changed output areas.

12. The method of claim 9, wherein the determining of whether the first housing portion or the third housing portion is folded includes: identifying whether the user is located in the second direction of the wearable electronic device, when the first housing portion and the third housing portion are unfolded.

13. The method of claim 12, wherein the identifying of whether the user is located in the second direction of the wearable electronic device includes: calculating a distance between the wearable electronic device and the user, when the user is located in the second direction of the wearable electronic device; and changing output areas or brightnesses of the screens based on the calculated distance.

14. The method of claim 13, wherein the identifying of whether the user is located in the second direction of the wearable electronic device includes: displaying the screens based on the second direction based on the changed output areas, when the user is located in the second direction of the wearable electronic device; and respectively displaying the screens based on the first direction and the second direction, when the user is not located in front of the wearable electronic device.

* * * * *